(12) United States Patent
Lavrentyev et al.

(10) Patent No.: US 11,494,252 B2
(45) Date of Patent: *Nov. 8, 2022

(54) SYSTEM AND METHOD FOR DETECTING ANOMALIES IN CYBER-PHYSICAL SYSTEM WITH DETERMINED CHARACTERISTICS

(71) Applicant: AO KASPERSKY LAB, Moscow (RU)

(72) Inventors: Andrey B. Lavrentyev, Moscow (RU); Artem M. Vorontsov, Moscow (RU); Pavel V. Filonov, Moscow (RU); Dmitry K. Shalyga, Moscow (RU); Vyacheslav I. Shkulev, Moscow (RU); Nikolay N. Demidov, Moscow (RU); Dmitry A. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 285 days.

This patent is subject to a terminal disclaimer.

(21) Appl. No.: 16/450,195

(22) Filed: Jun. 24, 2019

(65) Prior Publication Data

US 2020/0210263 A1  Jul. 2, 2020

(30) Foreign Application Priority Data

Dec. 28, 2018  (RU) ................ 2018147248

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/3452* (2013.01); *G06K 9/6257* (2013.01)

(58) Field of Classification Search
CPC .. G06F 11/079; G06F 11/3452; G06F 11/076; G06F 11/0736; G06F 11/9024; G06F 11/0754
See application file for complete search history.

(56) References Cited

U.S. PATENT DOCUMENTS 8,155,908 B2  4/2012  Nasle et al.
8,595,831 B2  11/2013  Skare
(Continued)

FOREIGN PATENT DOCUMENTS

| CN | 105259895 | 1/2006 |
|---|---|---|
| RU | 2625051 | 7/2017 |

(Continued)

OTHER PUBLICATIONS

European Extended Search Report for European Application No. 19215611 dated Apr. 29, 2020.
(Continued)

*Primary Examiner* — Katherine Lin
(74) *Attorney, Agent, or Firm* — Patterson Thuente Pedersen, P.A.

(57) ABSTRACT

Systems and methods for determining a source of anomaly in a cyber-physical system (CPS). A forecasting tool can obtain a plurality of CPS feature values during an input window and forecast the plurality of CPS feature values for a forecast window. An anomaly identification tool can determine a total forecast error for the plurality of CPS features in the forecast window, identify an anomaly in the cyber-physical system when the total forecast error exceeds a total error threshold, and identify at least one CPS feature as the source of the anomaly.

20 Claims, 21 Drawing Sheets

(51) Int. Cl.
*G06F 11/34* (2006.01)
*G06K 9/62* (2022.01)

(56) References Cited

U.S. PATENT DOCUMENTS

| | | |
|---|---|---|
| 9,218,570 B2 | 12/2015 | Biem |
| 9,405,900 B2 | 8/2016 | Dixit et al. |
| 9,569,615 B2 | 2/2017 | Kolacinski et al. |
| 9,846,839 B2 | 12/2017 | Nasle et al. |
| 9,961,089 B1 | 5/2018 | Sun et al. |
| 10,204,226 B2 | 2/2019 | Bushey et al. |
| 2005/0210337 A1 | 9/2005 | Chester et al. |
| 2006/0058898 A1 | 3/2006 | Emigholz et al. |
| 2007/0028219 A1 | 2/2007 | Miller et al. |
| 2007/0088448 A1 | 4/2007 | Mylaraswamy et al. |
| 2014/0108640 A1 | 4/2014 | Mathis |
| 2014/0189860 A1 | 7/2014 | Hull |
| 2014/0283047 A1 | 9/2014 | Dixit et al. |
| 2015/0326597 A1 | 11/2015 | Ciocarlie et al. |
| 2016/0217378 A1 | 7/2016 | Bellala et al. |
| 2016/0330225 A1 | 11/2016 | Kroyzer et al. |
| 2017/0091615 A1 | 3/2017 | Liu et al. |
| 2018/0159879 A1 | 6/2018 | Mestha et al. |
| 2018/0176241 A1* | 6/2018 | Manadhata ......... H04L 63/1425 |
| 2018/0219889 A1 | 8/2018 | Oliner et al. |
| 2018/0330083 A1 | 11/2018 | Abbaszadeh et al. |
| 2020/0067969 A1* | 2/2020 | Abbaszadeh ........ G06K 9/6269 |

FOREIGN PATENT DOCUMENTS

| | | |
|---|---|---|
| WO | WO2014109645 | 7/2014 |
| WO | WO2015104691 | 7/2015 |
| WO | WO2018048351 | 3/2018 |
| WO | WO2018102977 | 6/2018 |

OTHER PUBLICATIONS

Hewlett Packard. What is industrial? © 2019 https://www.hpe.com/ru/ru/what-is/industrial-iot.html As accessed on Jun. 24., 2019.

Lavin and S. Ahmad. "Evaluatine Real-time Anomaly Detection Algorithms—the Numenta Anomaly Benchmark," in 14th International Conference on Machine Learning and Applications (IEEE ICMLA'15), 2015.

"Main directions of the state policy in the area of safety of automated systems for control of production and technological processes of critical important facilities of the Russian Federation's infrastructure" (approved by the President of the Rf on Feb. 3, 2012, No. 803.

* cited by examiner

| | |
|---|---|
| 2022 | Accelerometer |
| 2023 | Gyroscope |
| 2024 | Hall Sensor |
| 2025 | Dosimeter |
| 2026 | NFC Module |
| 2027 | LTE Module |

| | |
|---|---|
| 2009 | Ultraviolet Radiation Sensor |
| 2010 | Geolocation Receiver |
| 2011 | GSM Module |
| 2012 | Bluetooth |
| 2013 | Wi-Fi |
| 2014 | Camera |
| 2015 | Ambient Temperature Sensor |
| 2016 | Barometer |
| 2017 | Electronic Compass |
| 2018 | Humidity Sensor |
| 2019 | Lighting Sensor |
| 2020 | Proximity Sensor |
| 2021 | Image Depth Sensor |

| | |
|---|---|
| 2001 | Heart Rate Monitor |
| 2002 | Blood Oxygen Saturation Sensor |
| 2003 | Pedometer |
| 2004 | Fingerprint Sensor |
| 2005 | Gesture Sensor |
| 2006 | Camera Directed at Eyes |
| 2007 | User Body Temperature Sensor |
| 2008 | Microphone |

FIG. 1d

Forecast errors modification GUI
971

FIG. 11b

SYSTEM AND METHOD FOR DETECTING ANOMALIES IN CYBER-PHYSICAL SYSTEM WITH DETERMINED CHARACTERISTICS

RELATED APPLICATION

This application claims the benefit of Russian Federation Patent Application No. RU2018147248, filed Dec. 28, 2018, which is fully incorporated by reference herein.

TECHNICAL FIELD

Embodiments relate generally to the field of computer security, and, more specifically, to security for cyber-physical systems.

BACKGROUND

Safe functioning of technological processes (TPs) is one of the current issues of industrial safety. For example, TPs in the petrochemical industry generally have a high process hazard rate, as they involve flammable and explosive liquids and gases at high temperatures and pressures. The main threats to such TPs can include: non-intentional errors or malicious actions in operation control; wear/tear and failure of equipment and devices; cyber attacks on control systems and information system, etc.

Cyber-physical system (CPS) safety systems are used to counter such threats—for example, at production facilities and businesses. These systems are traditionally built in several stages. When designing the facility, an Emergency Shutdown System (ESS) is built, which is subsequently integrated with an Industrial Control System (ICS), but which also allows manual control. The drawbacks of an ESS system include considerable inertness of processes and the existence of the human factor in the decision-making. Also, an ESS works based on an assumption of correct functioning of instruments. It does not appear practically possible to ensure entirely fail-safe functioning of instruments, because instruments occasionally fail, tend to have time-related errors, and redundancy of all instruments is extremely costly and is not always technically possible.

One way to monitor correctness of processes is to monitor individual devices, machines, instruments, control loops, etc., using built-in self-diagnostics systems. If a failure is detected, such systems send a signal to the process operator and usually require manual intervention for the device. Despite the advantages of such systems (for example, they "take into account" the specifics of the operation of a device, are designed by the equipment manufacturer, etc.), they have a number of deficiencies. Deficiencies include the aforementioned issues of instruments on which some self-monitoring systems are based. Another deficiency of such systems is that they are local and isolated from the monitoring of other non-local processes. In other words, every such system "sees" the process only within the limits of the equipment or device to which it is linked, without a logical or physical correlation between inter-related devices and units. As a result, detection of an anomaly in a process often happens at a later stage when it is already a threat to the correct operation of a device or equipment, requiring immediate response. In addition, in some cases, such systems, due to physical specifics of instruments (for example, a level gauge clogged by heavy oil products), have a tendency for multiple false responses, resulting in their forced disconnection by personnel.

Another traditional method for non-destructive monitoring of equipment and processes of technological systems (TSs) includes installing additional external (in relation to the equipment and ICSs) monitoring systems. This monitoring method actually involves the building of a parallel infrastructure, which includes instruments, communication lines, data collection and processing servers, etc. Such systems can be integrated with existing APC and ESS systems or can remain external in relation to them. Despite the advantages of these systems, such as redundant diagnostic instruments, specialized and efficient diagnostic methods, practically unlimited diagnostic information processing capacity, etc., their main deficiency consists in their high cost and complexity, and sometimes the impossibility to be deployed in actual production facilities.

Such issues are relevant for all cyber-physical systems that contain sensors and actuators, both for the above-described processes, which are part of TSs, and for the Internet of Things, and specifically, for the Industrial Internet of Things. For example, as a result of cyber attacks, sensors of the Internet of Things can provide incorrect values, which causes incorrect operation of the computer devices of the Internet of Things, which can result in such issues as increased electric energy consumption, unauthorized access to information, etc.

A technical problem occurs, requiring creation of a system for detecting anomalies in a cyber-physical system (CPS) having determined characteristics, in which the time elapsed from the moment of occurrence of the anomaly in the CPS to the moment of its detection is shorter than in the existing analogues.

One of the analogues is the technology proposed in the U.S. Patent Application Pub. No. 2014/0189860, which describes methods for detecting cyber attacks by finding deviations from a standard in the system's operation. The method uses various methods to detect deviations and determines vectors of cyber attacks. It also describes methods for discerning anomalies from "noises" causing deviations, for example, by setting threshold values. However, this technology does not solve the technical problem of the aforementioned technical problem.

SUMMARY

Embodiments described herein substantially meet the aforementioned needs of the industry. For example, a first technical result includes reducing, as compared with the known analogues, the time elapsed from the moment of occurrence of an anomaly in a cyber-physical system (CPS) having determined characteristics to the moment of its detection, by building a CPS feature values forecasting model and calculating a threshold of the total CPS error depending on the CPS characteristics, so that exceeding the calculated threshold by the total forecast error implies an anomaly in the CPS. A second technical result includes improving the accuracy of detection of anomalies in a CPS having determined characteristics by building a CPS feature values forecasting model and calculating a threshold of the total CPS error depending on the CPS characteristics.

In an embodiment, a system for determining a source of anomaly in a cyber-physical system (CPS) comprises a computing platform including computing hardware of at least one processor and memory operably coupled to the at least one processor; instructions that, when executed on the computing platform, cause the computing platform to implement: a forecasting tool configured to obtain a plurality of CPS feature values during an input window, the input window determined by a trained forecasting model, and forecast the plurality of CPS feature values for a forecast window using the trained forecasting model and the CPS feature values obtained during the input window; and an anomaly identification tool configured to determine a total forecast error for the plurality of CPS features in the forecast window, identify an anomaly in the cyber-physical system when the total forecast error exceeds a total error threshold, and identify at least one CPS feature as the source of the anomaly when the contribution of forecast error by the at least one CPS feature from among the plurality of CPS features to the total forecast error is higher than the contribution by other CPS features from among the plurality of CPS features to the total forecast error.

In an embodiment, a method for determining a source of anomaly in a cyber-physical system (CPS) comprises obtaining a plurality of CPS feature values during an input window, the input window determined by a trained forecasting model; forecasting the plurality of CPS feature values for a forecast window using the trained forecasting model and the CPS feature values obtained during the input window; determining a total forecast error for the plurality of CPS features in the forecast window; identifying an anomaly in the cyber-physical system when the total forecast error exceeds a total error threshold; and identifying at least one CPS feature as the source of the anomaly when the contribution of forecast error by the at least one CPS feature from among the plurality of CPS features to the total forecast error is higher than the contribution by other CPS features from among the plurality of CPS features to the total forecast error.

In an embodiment, a method for training a cyber-physical system (CPS) forecasting model comprises obtaining an initial sample, the initial sample including a plurality of historical CPS feature values; building a training sample based on the plurality of historical CPS feature values and at least one characteristic of the plurality of historical CPS features; building a trained forecasting model for forecasting the plurality of CPS feature values at each moment of a forecast window and based on a plurality of CPS feature values at each moment of an input window, the input window and the forecast window located within a monitoring period and selected depending on the at least one characteristic of the historical CPS features; and training the forecasting model based on the training sample.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 1b is a block diagram of an example of a particular implementation of the technological system of FIG. 1a.

FIG. 1d is a block diagram of a possible set of device sensors, according to an embodiment.

FIG. 11b depicts example GUI elements for modifying forecast errors, according to an embodiment.

Figure 1A:
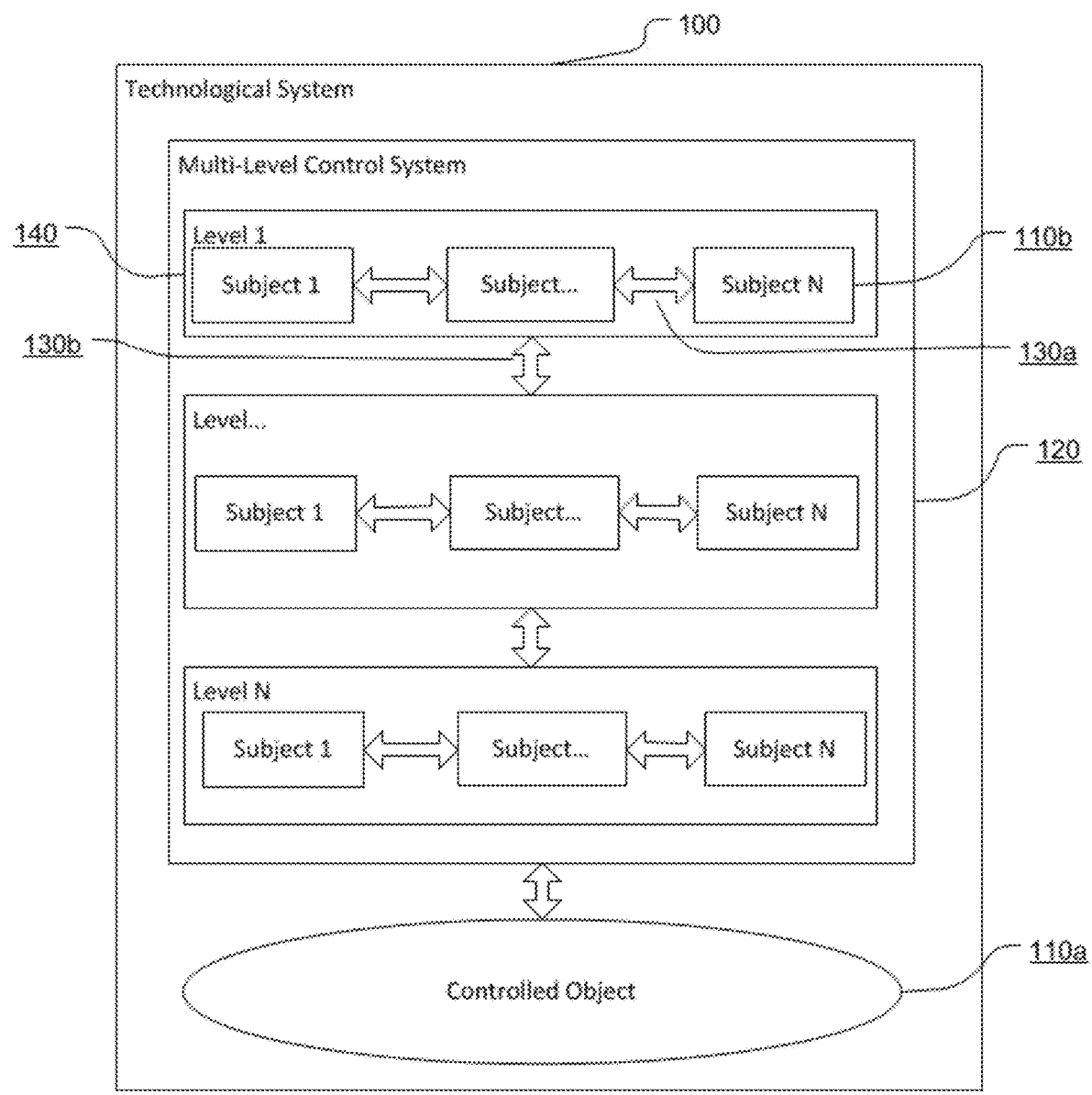
FIG. 1a is a block diagram of an example of a technological system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The following definitions and concepts are used throughout the description in particular embodiments.

For example, a controlled object is a process object to which external influences (control and/or disturbances) are directed, in order to change its state. In an embodiment, such objects can be a device (for example, an electric motor) or a process (or part thereof).

In an embodiment, a technological process (TP) can be a process of material production consisting in consecutive change of the states of a material substance (work object).

In an embodiment, process control can be a set of methods used for controlling technological parameters when making the final product.

In an embodiment, a control loop can consist of material substances and control functions for automated control of the values of measured technological parameters towards the values of the desired setpoints. A control loop contains sensors, controllers and actuators.

In an embodiment, a process variable (PV) can be a current measured value of a certain part of a TP being monitored or controlled. A process variable can be, for example, a sensor measurement.

In an embodiment, a setpoint can be a process variable value being maintained.

In an embodiment, a manipulated variable (MV) can be a variable being regulated in order to maintain a process variable value at a setpoint level.

In an embodiment, external influence can be a method of changing the state of an element to which the influence is directed (for example, an element of a technological system (TS)), in a determined direction. For example, influence from a TS element to another TS element can be sent in the form of a signal.

In an embodiment, a state of the controlled object can be a combination of its substantial properties expressed by state variables, which are modified or maintained under external influences, including controlling influences from a control subsystem. A state variable can be one or multiple numerical values characterizing a substantial property of an object. In an embodiment, a state variable is a numerical value of a physical quantity.

In an embodiment, a formal state of the controlled object can be a state of the controlled object corresponding to the process schedule and other technical documents (in the case of a TP) or movement schedule (in the case of a device).

In an embodiment, a controlling influence can be a purposeful (the purpose of the influence is to influence the object's state), legitimate (prescribed by the TP) external influence of controlling subjects of a control subsystem on a controlled object, which changes or maintains the state of the controlled object.

In an embodiment, a disturbance can be a purposeful or non-purposeful non-legitimate (not prescribed by the TP) external influence on the state of a controlled object, including by a controlling subject.

In an embodiment, a controlling subject can be a device which directs a controlling influence to a controlled object or transfers the controlling influence to another controlling subject for conversion before being directly sent to the object.

In an embodiment, a multilevel control subsystem can be a system including multiple levels, a combination of controlling subjects.

In an embodiment, a cyber-physical system can be an information technology concept involving integration of computing resources into physical processes. In such a system, sensors, equipment and information systems are connected all along the value creation chain which extends beyond the limits of a single enterprise or business. These systems interact with each other using standard Internet protocols for forecasting, self-adjustment, and adaptation to changes. Examples of a cyber-physical system include a technological system, the Internet of Things (including portable devices), or the Industrial Internet of Things.

In an embodiment, the Internet of Things (IoT) is a computer network of physical objects ("things") equipped with built-in technologies for interaction with each other or with the outside environment. The Internet of Things includes such technologies as portable devices, electronic systems of vehicles, smart cars, smart cities, or industrial systems, etc.

In an embodiment, the Industrial Internet of Things (IIoT) is a sub-category of the Internet of Things, which also includes consumer-oriented applications, for example, portable devices, "smart home" technologies and automatically driven cars. A distinguishing feature of both IoT and IIoT devices with built-in sensors, machines, and infrastructure, which send data through the Internet and are software-controlled.

In an embodiment, a technological system (TS) can be a functionally inter-related combination of controlling subjects of a multilevel control subsystem and a controlled object (TP or device), which, through a change in the states of controlling subjects, performs a change of the controlled object's state. The structure of a technological system is formed by the main elements of the technological system (inter-related controlling subjects of a multilevel control subsystem and a controlled object) and the relations between these elements. Where a technological process is the controlled object in a technological system, the final goal of the control is to change the state of the work object (raw material, a blank, etc.) through a change in the state of the controlled object. Where a device is the controlled object in a technological system, the final goal of the control is to change the state of the device (a vehicle, a spatial object). A functional inter-relation between the elements of a TS can be an inter-relation between the states of these elements. In this case, there may not be a direct physical connection between elements. In one example, there is no physical connection between actuators and a process operation, but, for example, a cutting speed can be functionally related to a spindle rotation rate, despite the fact that these state variables are not physically connected.

In an embodiment, a state of the controlling subject can be a combination of its substantial properties expressed by state variables, which are modified or maintained under external influences.

In an embodiment, substantial properties (and, accordingly, substantial state variables) of a controlling subject can be properties which directly influence substantial properties of the controlled object's state. In this case, the substantial properties of a controlled object are properties directly influencing the controlled factors (accuracy, safety, efficiency) of the operation of a TS. Particular examples include cutting modes matching formally preset modes, a train moving in accordance with a schedule, or reactor temperature maintained within acceptable limits. Depending on the controlled factors, variables of the controlled object's state are selected. Subsequently, variables of the states of the controlling subjects related to such variables and which exert controlling influence on the controlled object can be selected selected.

In an embodiment, a state of a technological system element can be a state of a controlling subject and/or a controlled object.

In an embodiment, a real state of a technological system element can be a state of a technological system element at some moment of influence on the controlled object, as determined by measuring state parameters and by intercepting signals (traffic) between the TS elements. State variables can be measured, for example, using sensors installed in a TS.

In an embodiment, a real state of a technological system can be a combination of inter-related real states of the technological system's elements.

In an embodiment, a cybernetic unit can be an element of a cyber-physical monitoring system that monitors the operation process of an element of the technological system.

In an embodiment, a state space can be a method for formalizing a change in the states of a dynamic system (a technological system or a cyber-physical system).

In an embodiment, a computer attack, or a cyber attack, can be a purposeful influence on information systems and information/telecommunication networks using software/technical means, exerted in order to breach information security in such systems and networks.

Referring to FIG. 1a, a block diagram of an example of a technological system 100 is depicted, according to an embodiment. Technological system 100 generally includes elements 110a and 110b, where the elements of a TS are: the controlled object 110a; the controlling subjects 110b, which form a multilevel control subsystem 120; horizontal relations 130a and vertical relations 130b. The controlling subjects 110b are grouped by levels 140.

Figure 1B:
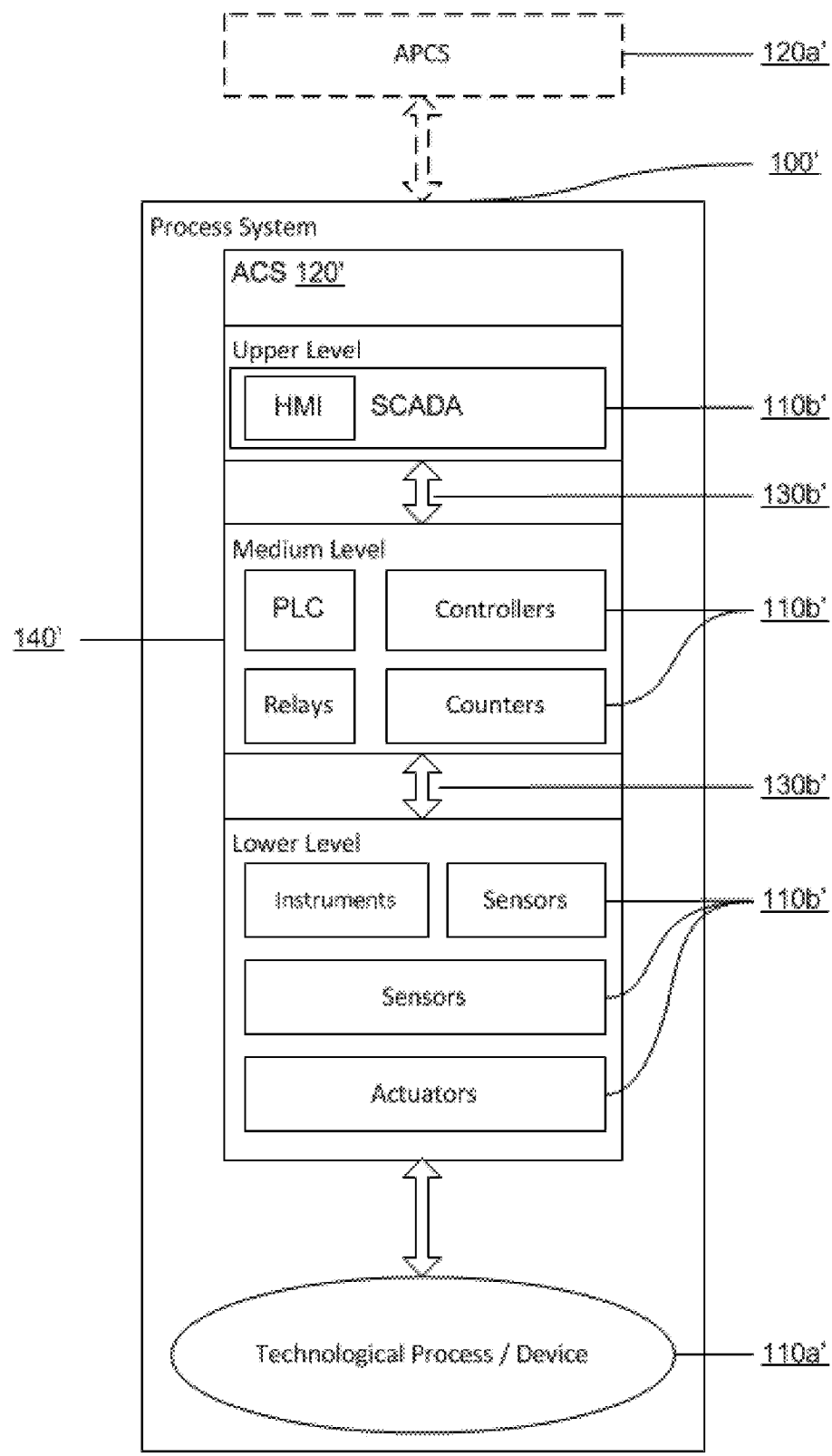

Referring to FIG. 1b, a block diagram of an example of a particular implementation of the technological system 100' of FIG. 1a is depicted. A controlled object 110a' is a TP or a device. Controlling influences are sent to the controlled object 110a'. Controlling influences can be generated and performed by an automated control system (ACS) 120'. In an ACS, and as illustrated, three levels 140' are distinguished. Three levels 140' are composed of controlling subjects 110b', which are inter-related both horizontally using horizontal links (links within the level, not shown in FIG. 1b) and vertically using vertical links 130b' (links between the levels). The inter-relations can be functional such that a change of the state of a controlling subject 110b' on one level causes a change of the states of controlling subjects 110b' linked thereto, on that level and on other levels. The information about a change in the controlling subject's state can be sent in the form of a signal using the horizontal and vertical links established between the controlling subjects, i.e. the information about a change in the state of the controlling subject in question is an external influence in relation to other controlling subjects 110b'. The levels 140' in an ACS 120' are distinguished based on the purpose of the controlling subjects 110b'. The number of levels can vary depending on complexity of the automated control system 120'. Simple systems can contain one or multiple lower levels. For the physical connection of TS elements (110a, 110b) and TS subsystems 100, wired networks, wireless networks, or integrated circuits are used. For the logical connection between TS elements (110a, 110b) and TS subsystems 100, Ethernet, industrial Ethernet, and industrial networks are used. Industrial networks and protocols or various types and standards are used: Profibus, FIP, ControlNet, Interbus-S, DeviceNet, P-NET, WorldFIP, LongWork, Modbus, etc.

The upper level (the supervisory control and data acquisition (SCADA) level) is a dispatcher/operator control level. In an embodiment, the upper level includes at least the following controlling subjects 110b': controllers, controlling computers, human-machine interfaces (HMIs) (shown in FIG. 1b as parts of a single SCADA controlling subject). The upper level is configured for tracking the states of TS elements (110a', 110b'), receiving and accumulating information about the state of TS elements (110a', 110b'), and when correction is needed for TS elements.

The middle level (the CONTROL level) is a level of controllers; it includes at least the following controlling subjects: programmable logic controllers (PLCs), counters, relays, regulators. The controlling subjects 110b' of the PLC type receive information from controlling subjects of "measuring instrumentation" type and from controlling subjects 110b' of the "sensors" type about the state of the controlled object 110a'. "PLC" type controlling subjects generate (create) controlling influence in accordance with a programmed control algorithm on "actuator" type controlling subjects. The actuators directly exert controlling influence (applying to the controlled object) on the lowest (Input/Output) level. An actuator is an element of an executive device (equipment). Controllers, for example, PID (proportional integral derivative) controllers, are devices in a control loop with feedback.

The lowest (Input/Output) level is the level of such controlling subjects as: sensors, instruments, which monitor the state of the controlled object 110a', and actuators. Actuators directly influence the state of the controlled object 110a' in order to bring it into compliance with the formal state, i.e. a state matching a process task, a process schedule or other technical documents (in the case of a TP), or with a movement schedule (in the case of a device). On this level, signals from "sensor" type controlling subjects 110b' are coordinated with the inputs of the middle-level controlling subjects, and the "PLC" type controlling influences generated by the controlling subjects 110b' are coordinated with the "actuator" type controlling subjects 110b', which carry the instructions out. An actuator is an element of an executive device. An executive device makes a regulating unit move in accordance with signals coming from a controller or a controlling device. Executive devices are the final link of the automated control chain and can generally include: amplification devices (a contactor, a frequency modulator, an amplifier, etc.); actuators (an electrical, pneumatic, or hydraulic drive) with feedback elements (output shaft position sensors, end position alarm sensors, manual drive sensors, etc.); or regulating units (faucets, valves, shutters, dampers, etc.).

Depending on the application environment, executive devices can have different designs. Actuators and regulating units are usually considered to be the main components of executive devices. In an embodiment, an executive device as a whole is called an actuator.

In an embodiment, ABCS 120a' is an Automated Business Control System.

Figure 1C:
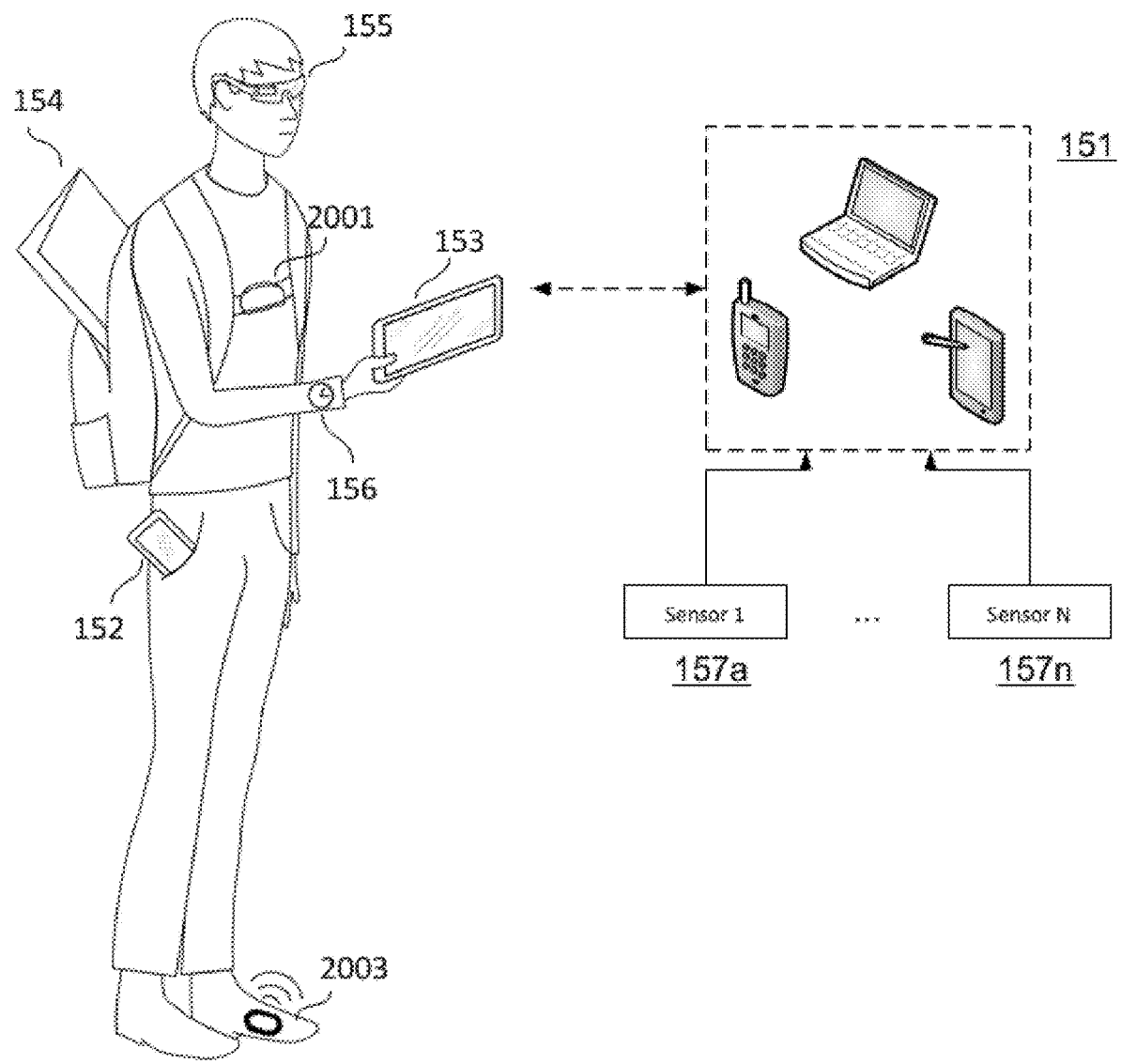
FIG. 1c is an illustration and block diagram of an example system utilizing the Internet of Things with portable devices, according to an embodiment.

Referring to FIG. 1c, an illustration and block diagram of an example system utilizing the Internet of Things with portable devices is depicted, according to an embodiment. In an embodiment, the system includes multiple various user computer devices 151. The user devices 151 can include, for example: a smartphone 152, a tablet 153, a notebook 154, portable devices, such as augmented reality goggles 155, a fitness tracker, and/or a smart watch 156, etc. The user devices 151 contain multiple various sensors 157a-157n, for example, a heart rate monitor 2001 and a pedometer 2003.

It should be noted that the sensors 157a-157n can be located on either a single or multiple user devices 151. In addition, some sensors can be located on multiple devices at the same time. Some sensors can be provided in multiple copies. For example, a Bluetooth module can be located on all devices, while a smartphone can contain two or more microphones to suppress noise and to determine the distance to the sound source.

Referring to FIG. 1d, a block diagram of a possible set of device sensors is depicted, according to an embodiment. More particularly, FIG. 1d depicts a possible set of sensors of the devices 151. The sensors 157a-157n can include, for example, the following:

a heart rate monitor (heartbeat sensor) 2001 for determining the user's pulse rate. In one embodiment, a heart rate monitor can contain electrodes and take an electrocardiogram;

a blood oxygen saturation sensor 2002;

a pedometer 2003;

a fingerprint identification sensor 2004;

a gesture sensor 2005, used to identify user gestures;

a camera directed at the user's eyes 2006, for identification of the user's eye movements and for authentication of the user's identity by the eye's iris or retina;

a user body temperature sensor 2007 (for example, a sensor directly touching the user's body or a touchless one);

a microphone 2008;

an ultraviolet radiation sensor 2009;

a geolocation system receiver 2010, for example, a GPS, GLONASS, BeiDou, Galileo, DORIS, IRNSS, QZSS receiver, etc.;

a GSM module 2011;

a Bluetooth module 2012;

a Wi-Fi module 2013;

a camera 2014, directed at the environment surrounding the user device;

an ambient temperature sensor 2015;

a barometer 2016, for measuring atmospheric pressure and for determining the elevation above sea level in accordance with the atmospheric pressure;

a geomagnetic sensor 2017 (e.g. an electronic compass), for determining the cardinal directions and the azimuth;

an air humidity sensor 2018;

a lighting level sensor 2019, for determining color temperature and illumination;

a proximity sensor 2020, for determining the distance to various objects located in the proximity;

an image depth sensor 2021, for obtaining a three-dimensional image of space;

an accelerometer 2022, for measuring acceleration in space;

a gyroscope 2023, for determining position in space;

a Hall sensor 2024 (a magnetic field sensor), for determining magnetic field density;

a dosimeter/radiometer 2025, for determining radiation levels;

an NFC module 2026;

an LTE module 2027.

Figure 2:
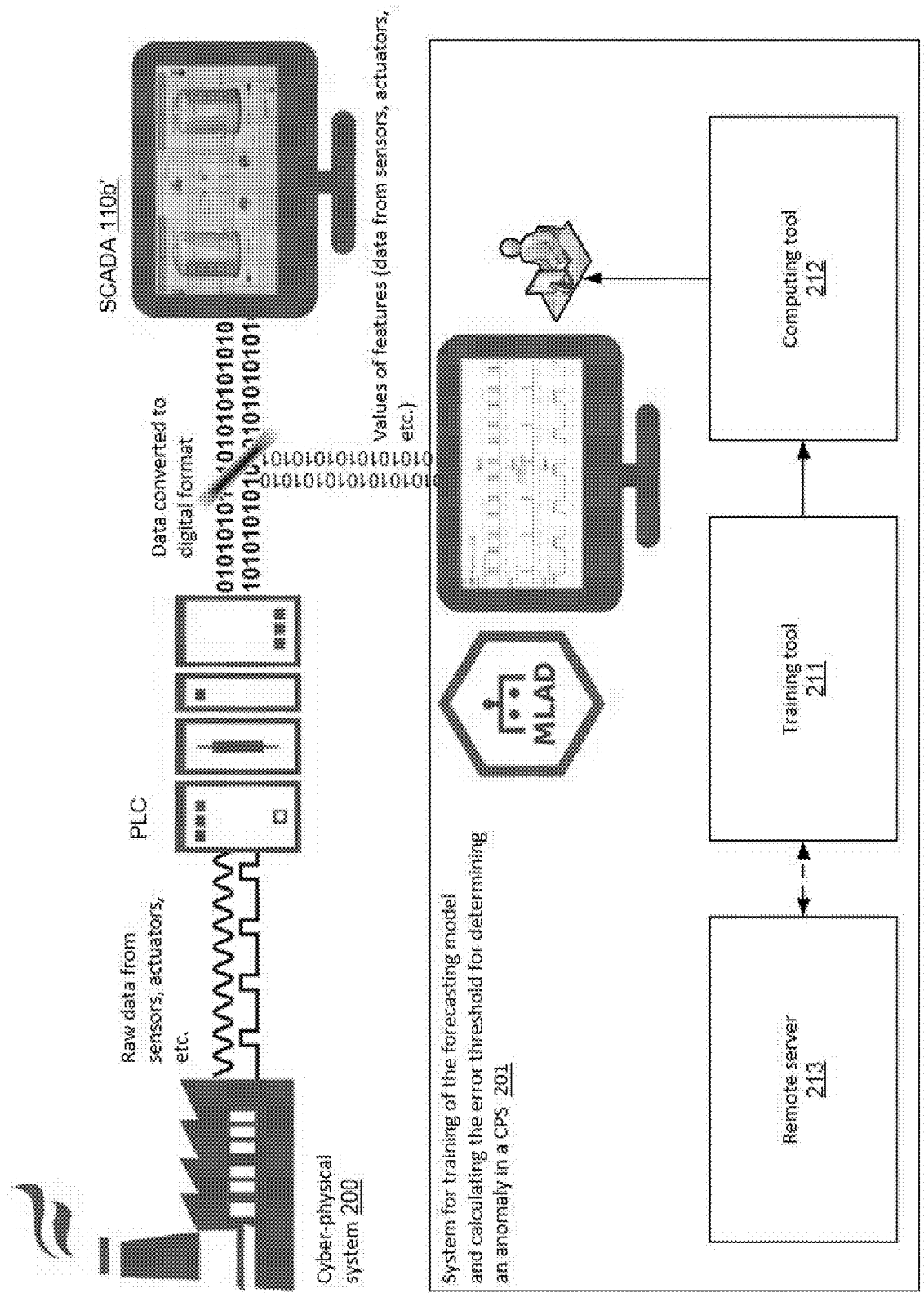
FIG. 2 is a block diagram of a system for training a CPS feature values forecasting model having determined characteristics, and for calculating an error threshold for finding an anomaly in the CPS, according to an embodiment.

Referring to FIG. 2, a block diagram of a system for training a CPS feature values forecasting model having determined characteristics, and for calculating an error threshold for finding an anomaly in the CPS 201 is depicted, according to an embodiment. In particular, the CPS characteristics can be taken into account when the forecasting model is trained. The cyber-physical system 200 is shown in a simplified version. Examples of a cyber-physical system 200 are the above-described technological system 200 (see FIGS. 1a-1b), the Internet of Things (see FIGS. 1c-1d), the Industrial Internet of Things. For ease of discussion, a TS is hereinafter discussed as the main example of a CPS 200.

The system 201 includes a training tool 211 and a computing tool 212 operably coupled to the training tool 211. As was already mentioned in the discussion of FIGS. 1a-1b, a CPS can include multiple controlling subjects, such as sensors, actuators, and PID controllers. Data from these components can be sent to a PLC in raw form. For example, an analog signal can be used. Then, the PLC processes the data and converts the data to digital format. Subsequently, the PLCS sends the digital data to the SCADA system 1101o' and to the system 201 being discussed. Thus, the training tool 211 receives an initial sample containing values of CPS 200 features for the historical CPS monitoring period (i.e. CPS telemetry data), in which the share of anomalies does not exceed a set value (for example, not more than 1%). CPS features are numerical characteristics of controlling subjects (sensors, actuators, PID controllers). The training tool 211, on the basis of the initial sample and taking into account the CPS characteristics, builds a training sample, which includes the values of at least one of the received CPS features for the monitoring period not exceeding the historical monitoring period. Also, in an embodiment, at least one moment of time where an anomaly occurred is included in the training sample. The building of the training sample can include stages of denoising, reducing, or eliminating noise from the initial sample data, removal of gaps in the data, of surges in feature values, of invalid data sets, conversion to an equispaced time grid, and exclusion of features causing false triggering (for example, readings of a malfunctioning sensor) from the initial sample. In an embodiment, the building of a training sample can occur using the CPS's technical documentation (for example, describing possible states and technical characteristics of sensors and actuators), and/or on the basis of the data provided by CPS users (for example, information on known malfunctioning sensors).

The training tool 211 is further configured to build a CPS feature value forecasting model at each moment of time of the forecast window using the CPS feature values data at each moment of the input window time. For example the input window and the forecast window can be time intervals contained within the monitoring period and selected in accordance with the CPS characteristics. CPS feature values are saved with a set frequency within the monitoring period. For example, if the CPS feature values are saved every second, the above-mentioned time moments are also distinguished every second. The distance between the input window and the forecast window is the forecast horizon (for example, from the end of the input window to the beginning of the forecast window), which also depends on the CPS characteristics. In an embodiment, the input window and the forecast window can overlap. In another embodiment, the input window and the forecast window do not overlap. The forecast horizon can assume either nonnegative values (forecast for the future), or negative values (for example, an encoding-decoding type analysis).

The training tool 211 then trains the forecasting model using the training sample data. The computing tool 212, using the trained forecasting model, forecasts values of PCS features at each moment of time of the monitoring period. The computing tool 212 determines the total error of the forecast (i.e., for the forecasted values of the PCS features). For example, the computing tool 212 can utilize the average error or average weighted error between the monitored feature values and the forecasted feature values, which is calculated at each moment of time of the forecast window. Then, using the training tool 211, a total error threshold is calculated depending on the CPS characteristics, in such a manner that, if the total forecast error exceeds the calculated threshold, an anomaly is present in the CPS. In an embodiment, the total error threshold is a set accuracy percentage of the total forecast error, for example, at the 99% significance level.

An anomaly in a CPS can occur, for example, due to a cyber attack, a human intervention in the TS or TP operation, due to a failure or deviation in a process related with mode change periods, due to a transfer of control loops to manual mode, incorrect sensor readings, or for other reasons specific to the technology.

In an embodiment, the system 201 additionally includes a remote server 213. The remote server can perform some functions of the training tool 211 and of the computing tool 212, such as building and training of a forecasting model, as well as forecasting values of CPS features for the monitoring period, and determining the total forecast error and calculating the total forecast error threshold. In another embodiment, the training tool 211 and the computing tool 212 can be located on a remote server 213. Since a remote server 213 can have substantially greater computing capabilities than the training tool 211 and the computing tool 212, the performance of these functions by a remote server 213 increases the speed and quality of the operation of the system 201.

Figure 4:
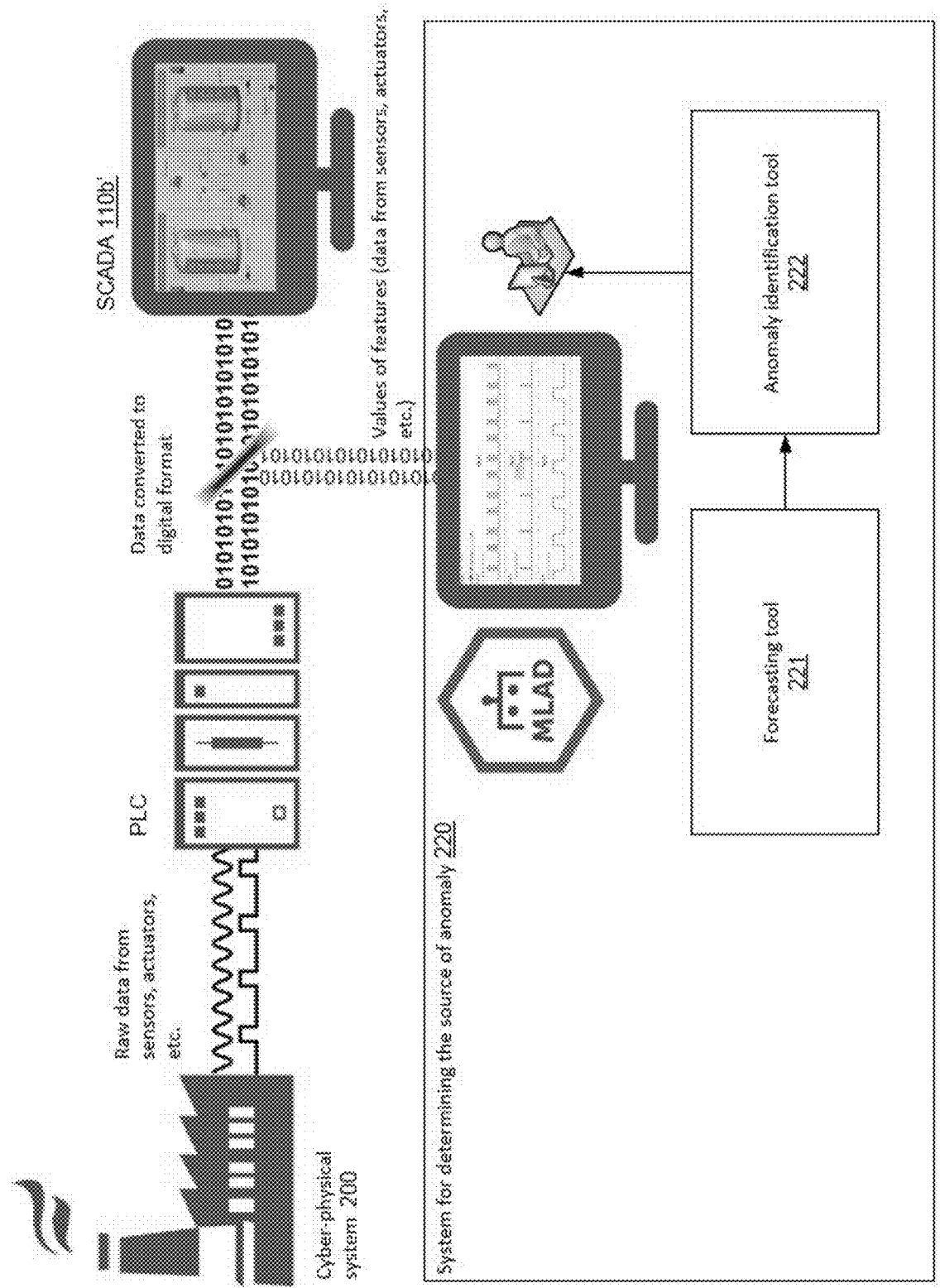
FIG. 4 is a block diagram of a system for detecting the source of a CPS anomaly, according to an embodiment.
Figure 5:
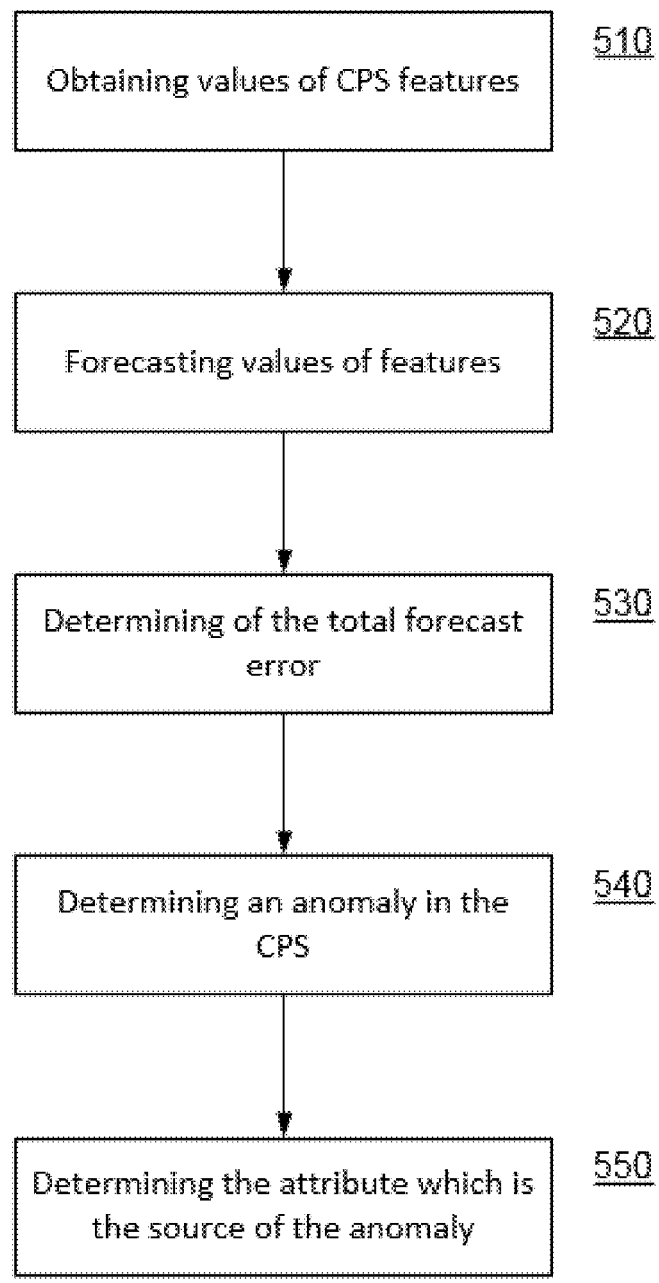
FIG. 5 is a flowchart of a method for detecting a source of an anomaly in a CPS having determined characteristics, according to an embodiment.

Therefore, the system 201 trains the forecasting model, determines the size of the input window and forecast window, and determines the threshold of the total forecast error, which can all be used in the system and method for determining a source of anomaly in a CPS (see FIGS. 4-5).

In an embodiment, the CPS features include at least one of: a sensor measurement (sensor process variable); a controlled variable of an actuator; a setpoint of an actuator; or input signals or an output signal of a PID controller; internal variables of a PID controller.

In yet another embodiment, time moments with known CPS anomalies are marked in the initial sample. In such an example, such time moments with known CPS anomalies are included in the training sample. Thus, the initial sample will also contain information about the time moments when known anomalies occurred in the CPS (marking). Accordingly, the forecasting model can be trained and used to determine the total error threshold more accurately.

In another embodiment, the time moments when CPS anomalies occur are marked when building a training sample. In yet another embodiment, a test sample is built from the initial sample. A test sample can be built based on the test sample data. The forecast quality can be assessed, and, if the forecast quality assessment does not meet the set criteria, training of the forecast model is repeated until the forecast quality assessment meets the set criteria (so as to avoid overfitting). If the forecast quality assessment does not meet the set criteria, a different forecasting model can be chosen. The forecast quality can be determined, for example, by one of the quality metrics: a NAB (Numenta Anomaly Benchmark) metric, or an F1 metric.

In an embodiment, a cyber-physical system can include one or more of the following characteristics:

the production industry in which the cyber-physical system operates;

process types that describe CPS variables, in particular, one of the following: continued, conveyor, cyclical (for example, for cyclical processes, a monitoring period divisible by a period of one cycle can be chosen);

existence of seasonal nature and/or trends in the CPS features;

inertness of CPS processes;

time of the CPS's response to changes occurring in the CPS and in the external environment;

hazard level of the production for the personnel and the environment;

cost of process downtime due to abnormal situations;

control type, in particular, control using PID controllers, state machines, or a combined method;

controlling subject type, for example a sensor, an actuator, or a PID controller; CPS self-diagnostics data;

controlling subject condition status (good condition or bad condition);

inter-relation of controlling subjects on a process level.

In an embodiment, petrochemical industry companies, their individual units and assemblies are an example of a CPS. Such companies can have one or several of the following CPS characteristics:

high value of the continued process operation time period (for example, from one year);

long process response time (for example, more than one minute). Thus, when building a forecasting model, a longer monitoring period is chosen for a CPS type characterized by a longer time of response of the CPS variables to changes in other CPS variables and external factors;

existence of seasonal nature of the TPs;

high hazard level of the production for the personnel and the environment. Accordingly, when building a forecasting model, a low total error threshold is chosen for a CPS characterized by a high level of production hazard, in order to detect a larger number of anomalies. This means that the total error threshold can be calculated as a set accuracy percentage of the total forecast error, or a lower order percentage (for example, 0.90). In this case, false triggering would probably occur; however, this will not affect the production process in any way, but will allow, at the analysis stage of data encoding/decoding type, detection of more anomalies using the model, and, with input from the CPS user, specifying an error threshold value so as to exclude false triggering and keep all important analyzed anomalies;

high cost of TP downtime.

Downstream oil refining processes are characterized by the presence of control systems based on PID (cascade) control principles and containing a large number (usually over a hundred) self-regulating control loops, inter-related by both designed and built-in control logic and the process physics, as well as controlling such values as temperature, pressure, fluid levels, etc. The specifics of this control system design allows for a whole range of process monitoring methods, including neural networks, methods for HD controllers firmware integrity analysis, and analysis of correctness of their setpoints, etc. The existence of such specific oil refining factors as high paraffin content of liquid process components, high refining temperatures (usually about 350 degrees Celsius), coke production and coke filling in machines, etc., causes such specifics of these variables as strong noises, gaps and surges in instrumentation data, presence of trend components in control data, invalidity of some instrument data sets, etc. Also, such factors as occasional switching of PID controllers to manual mode, used both for normal control of units and in abnormal situations (which substantially affect the data of variables) should be included in the specifics of a control system based on PID controllers. Thus, in the above example, the CPS characteristics affect the values of CPS features, the building of the forecasting model, and the determination of the total forecast error.

Therefore, the above-described method allows for a reduction in the time elapsed from the moment of occurrence of an anomaly in a cyber-physical system (CPS) having determined characteristics to the moment of its detection when compared to traditional systems. In particular, by building a CPS feature values forecasting model and calculating a threshold of the total CPS error depending on the CPS characteristics, exceeding of the calculated threshold by the total forecast error indicates an anomaly in the CPS. Embodiments also improve the accuracy of detection of anomalies in a CPS having determined characteristics, by building a CPS feature values forecasting model and calculating a threshold of the total CPS error depending on the CPS characteristics. In addition, the time elapsed from the moment of occurrence of the anomaly in the CPS to the moment of its detection is shorter than in the traditional systems.

Thus, in an embodiment, a low total error threshold is chosen for a CPS type characterized by a high level of production hazards for the personnel and the environment. In another embodiment, a longer monitoring period is chosen for a CPS type characterized by a longer time of response of the CPS variables to changes in other CPS variables and external factors.

In yet another embodiment, when calculating the total forecast error, for errors of each CPS feature, weight ratios are used. For example, a low value can be assigned to the weight ratio for a feature when the controlling subject characterized by this feature provides data with noisy or invalid data, or if controlling subject is disabled by the CPS user. In another example, a low value can be assigned to the weight ratio for a feature in which the occurrence of an anomaly does not affect the CPS operation, and a high value can be assigned to the weight ratio for a feature in which the occurrence of an anomaly affects the CPS operation. Values of weight ratios of features equal to one can be implemented in embodiments (equivalent to the absence of weight ratios).

In yet another embodiment, a training sample additionally includes features of at least one other CPS, which has at least the pre-determined number of the same characteristics as the current CPS. Therefore, the system 201 will be able to train the forecasting model more accurately and determine the error threshold using data of multiple CPSs having the same characteristics.

In an embodiment, exponential smoothing is applied to the total forecast error. Exponential smoothing can be used to reduce the value of the error.

In an embodiment, the forecasting model comprises a neural network. In another embodiment, the forecasting model comprises a set of models, i.e. an ensemble making a decision by averaging the results of the operation of individual models from the set. In yet another embodiment, the neural network is optimized using genetic algorithms. In another embodiment, the neural network is chosen using one of the quality metrics: a NAB metric, an F metric.

In yet another embodiment, when calculating the total forecast error, weight ratios are used for the errors of each CPS feature. For example, the value of an feature's weight ratio is determined by how accurately the values of this CPS feature can be forecasted (such as using the previous model forecasting results). In this case, a weighted error with determined weight ratios can be considered as the forecast error.

In an embodiment, when building a training sample, CPS technical documentation, such as information describing possible states and technical characteristics of sensors and actuators, is used. Such (a priori) documentation allows for the building of a higher-quality model. In particular, by the CPS technical documentation can be used to set the model variables (choice of weight ratios when calculating the total forecast error, choice of the monitoring period, modification of the total error threshold, etc.).

In another embodiment, a posteriori information such as a user report or operator report can be used to improve the model quality or to build future models. In particular, the user report can be used to set the model variables.

The value of a feature's weight ratio can be assigned by the training tool 211 depending on the significance of the feature and based on the CPS technical documentation or user report. For example, if a certain sensor often fails or provides false readings, it can be assigned a low weight ratio value or even a zero value. As a result, the particular sensor readings will not affect the forecasting model and the error threshold value for determining an anomaly in the CPS.

In an embodiment, a CPS features registry is built using the training tool 211, utilizing the CPS technical documentation or a user report. For example, the registry contains, in particular, a description of the feature, a physical dimension of the feature, if the feature describes a physical quantity of a CPS object, the feature's design measuring accuracy, the feature's weight ratio, and the name of the object described by the feature. In an embodiment, the forecasting model is built taking into account the CPS features registry, which is used to set the model variables.

In another embodiment, when building the training sample, the monitoring period does not include the values of the CPS features at the time moments where it is known that the CPS feature values are abnormal. In particular, time periods when the CPS undergoes startup, adjustment, diagnostic measures, or the periods of manual control of the CPS can be excluded.

In an embodiment, the forecasting model is built by the training tool 211 as follows. First, a neural network architecture template is chosen. For example, a multilayer perceptron, a convolution neural network, a recurrent neural network, or others can be selected. Then, a description of the chosen architecture is built including an optimizer and its variables, initial values of the weight ratios and shifts, the maximum number of layers, and for each layer: a list of possible layer types, composed of at least a subset of the following layers: Dense, Convolutional, GRU, LSTM, Dropout; the activation function: linear, ReLU, Tanh, sigmoid, Softmax, etc.; and the possible layer size (the number of neurons in the layer).

Then, the neural network architecture is optimized using the optimizer. In an embodiment, the neural network architecture is optimized using genetic algorithms. A quality metric is also used to select the best architecture. In an embodiment, one of the following quality metrics is used: a NAB metric, an F1 metric.

Figure 3:
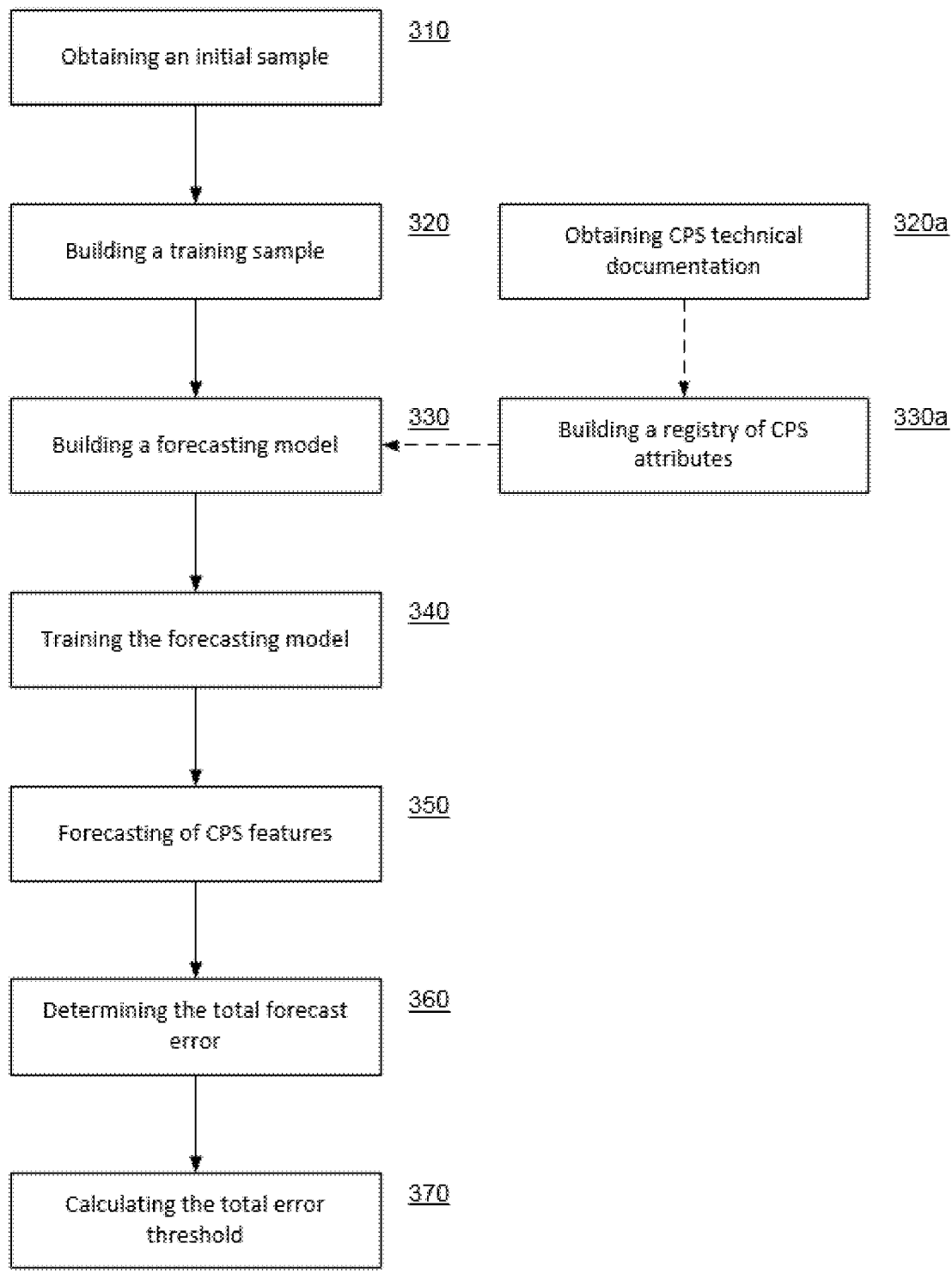
FIG. 3 is a flowchart of a method for training a CPS feature values forecasting model and for calculating an error threshold for finding an anomaly in a CPS having determined characteristics, according to an embodiment.

Referring to FIG. 3, a flowchart of a method for training a CPS feature values forecasting model and for calculating an error threshold for finding an anomaly in a CPS having determined characteristics is depicted, according to an embodiment.

At 310, an initial sample is obtained. In an embodiment, the initial sample can include values of CPS features for a historical period of CPS monitoring. In an embodiment, the share of anomalies in the initial sample does not exceed a set value. Then, at 320, on the basis of the initial sample and taking into account the CPS characteristics, a training sample is built, which includes the values of at least one of the above-mentioned CPS features for the monitoring period not exceeding the historical monitoring period. In an embodiment, at least one moment of time where an anomaly occurred is included in the training sample. At 330, a model for forecasting values of CPS features at each moment of the forecast window is built, based on the data of values of the said CPS features at each moment of the input window. The input window and the forecast window can be located within the monitoring period and can be selected depending on the CPS characteristics, while the distance between the input window and the forecast window is equal to the forecast horizon chosen depending on the CPS characteristics.

Then, at 340, the forecasting model is trained using the training sample data.

At 350, using the trained forecasting model, the method forecasts the values of PCS features at each moment of time of the monitoring period. After that, at 360 the total error of the forecast obtained using the pre-built forecasting model at each moment of the monitoring period is determined. At 370 a total error threshold depending on the CPS characteristics is calculated. In an embodiment, when the total forecast error exceeds the calculated threshold, an anomaly in the CPS has been detected. One skilled in the art will understand that embodiments disclosed earlier in relation to the system 201 shown in FIG. 2 can also apply to the method described in FIG. 3. For example, in one embodiment, at 320a, CPS technical documentation or a user report based on the previously detected anomalies is received. Then, at 330a, a CPS features registry is built using the training tool 211, utilizing the CPS technical documentation or a user report. For example, the registry can contain, in particular, a description of the feature, a physical dimension of the feature, if the feature describes a physical quantity of a CPS object, the feature's design measuring accuracy, the feature's weight ratio, and the name of the object described by the feature. Thus, a forecasting model is built at 330, taking into account the CPS features registry.

Referring to FIG. 4, a block diagram of a system for detecting the source of a CPS anomaly is depicted, according to an embodiment. In particular, the system for determining the source of an anomaly 220 includes a forecasting tool 221 and an anomaly identification tool 222. The forecasting tool 221 is configured for obtaining CPS feature values during an input window, which is determined by a trained forecasting model, and also for forecasting CPS feature values for a forecast window using the trained forecasting model and based on the CPS feature values data obtained during the input window. In an embodiment, CPS features are numerical characteristics of sensors, actuators, PID controllers. The input window and the forecast window are time intervals set in the trained forecasting model. In an embodiment, the input window includes feature values based on which the feature values for the forecast window are forecasted. For example, feature values can be determined by the system and the method described in FIGS. 2-3. The input window and the forecast window are included within the monitoring period and can be selected in accordance with the CPS characteristics. The distance between the input window and the forecast window is the forecast horizon (for example, from the end of the input window to the beginning of the forecast window), which also depends on the CPS characteristics. The forecast horizon can assume either nonnegative values (forecast for the future), or negative values. In an embodiment, the input window and the forecast window can overlap (the forecast horizon is negative). In another embodiment, the input window and the forecast window do not overlap (the forecast horizon is positive).

The anomaly identification tool 222 is configured for determining the total forecast error for CPS features for the forecast window, for identifying an anomaly in the CPS when the total forecast error exceeds the total error threshold (i.e. the total error threshold value), and for identifying at least one CPS feature which is the source of the anomaly, if the contribution of the forecast error by the said at least one CPS feature (from among all the CPS features from the above-mentioned list of features) to the total forecast error is higher than the contribution by other CPS features (from among all the CPS features from the above-mentioned list of features) to the total forecast error. For example, five CPS features with the greatest forecast error are identified among all the CPS features from the above-mentioned list of features. In an embodiment, the total error threshold is a set accuracy percentage of the total forecast error, for example, at the 99% significance level.

In an embodiment, the CPS feature values are inputted or received in real time. Therefore, for the forecast window, the total forecast error is determined after a time equal to the sum of the forecast horizon and the input window, i.e. when real CPS feature values will be obtained at each time moment of the forecast window.

In another embodiment, if CPS feature values are contained in an initial sample for a historical monitoring period (i.e. for the entire time period during which monitoring was performed), the total forecast error is determined for the forecast window using the initial sample data for the historical monitoring period.

In an embodiment, the CPS features include at least one of the following: a sensor measurement (sensor process variable); a controlled variable of an actuator; a setpoint of an actuator; or input signals or an output signal of a PID controller.

In an embodiment, a cyber-physical system includes at least one of the following characteristics:

the production industry in which the cyber-physical system operates;

process types that describe CPS variables, in particular, one of the following: continued, conveyor, cyclical;

existence of seasonal nature and/or trends in the CPS features;

inertness of CPS processes;

time of the CPS's response to changes occurring in the CPS and in the external environment;

hazard level of the production for the personnel and the environment;

cost of process downtime due to abnormal situations;

control type, in particular, control using PID controllers, state machines, or a combined method;

controlling subject type, characterized by at least one feature; in this case, the controlling subject type is one of the following: a sensor, an actuator, or a PID controller;

CPS self-diagnostics data;

controlling subject condition status;

inter-relation of controlling subjects on the process level.

In an embodiment, the forecasting model is a neural network. In another embodiment, the forecasting model contains a set of models, such as an ensemble, which makes a decision by averaging the results of the operation of individual models from the set. In yet another embodiment, the neural network is optimized using genetic algorithms. In another embodiment, the neural network is chosen using one of the quality metrics: a NAB metric, an F1 metric.

In yet another embodiment, when calculating the total forecast error, for errors of each CPS feature, weight ratios are used. For example, a low value is assigned to the weight ratio for a feature if the controlling subject characterized by this feature provides data with noise or invalid data, or is occasionally disabled by the CPS user. In another example, a low value can be assigned to the weight ratio for a feature in which the occurrence of an anomaly does not affect the CPS operation, and a high value can be assigned to the weight ratio for a feature in which the occurrence of an anomaly affects the CPS operation. In one embodiment, exponential smoothing is applied to the total forecast error to reduce the error.

In another embodiment, when calculating the total forecast error, weight ratios are used for the errors of each CPS feature. For example the value of a feature's weight ratio is determined by how accurately the values of this CPS feature can be forecasted. In this case, an error weighted with determined weight ratios can be considered as the forecast error.

In yet another embodiment, the CPS's technical documentation or a user report on the anomalies previously detected by the trained system is obtained. For example, a feature's weight ratio is chosen using the training tool 211 depending on the significance of the feature and based on the CPS technical documentation or user report.

Referring to FIG. 5, a flowchart of a method for detecting a source of an anomaly in a CPS having determined characteristics is depicted, according to an embodiment. At 510, the method obtains CPS feature values during the input window, which is determined by the trained forecasting model (used in the system and method shown in FIGS. 3-4). At 520 the method forecasts the CPS feature values for the forecast window, using the trained forecasting model and based on the CPS feature values data obtained during the input window. At 530, the method determines the total forecast error for CPS features for the forecast window, and, if the total forecast error exceeds the total error threshold, at 540, the method identifies an anomaly in the CPS. Finally, at 550, the method identifies at least one CPS feature which is the source of the anomaly, if the contribution of the forecast error by the said at least one CPS feature to the total forecast error is higher than the contribution by other CPS features to the total forecast error. For example, five CPS features with the greatest forecast error are identified among all the CPS features from the above-mentioned list of features.

In an embodiment, the CPS feature values are inputted in a real time mode. Therefore, for the forecast window, the total forecast error is determined after a time equal to the sum of the forecast horizon and the input window, i.e. when real CPS feature values will be obtained at each time moment of the forecast window.

In another individual case, if CPS feature values are contained in an initial sample for a historical monitoring period, the total forecast error is determined for the forecast window using the initial sample data for the historical monitoring period.

In an embodiment, the CPS features include at least one of the following: a sensor measurement (sensor process variable); a controlled variable of an actuator; a setpoint of an actuator; input signals or an output signal of a PID controller.

In an embodiment, a cyber-physical system has at least one of the following characteristics:
the production industry in which the cyber-physical system operates;
process types that describe CPS variables, in particular, one of the following: continued, conveyor, cyclical;
existence of seasonal nature and/or trends in the CPS features;
inertness of CPS processes;
time of the CPS's response to changes occurring in the CPS and in the external environment;
hazard level of the production for the personnel and the environment;
cost of process downtime due to abnormal situations;
control type, in particular, control using PID controllers, state machines, or a combined method;
controlling subject type, characterized by at least one feature; in this case, the controlling subject type is one of the following: a sensor, an actuator, or a PID controller;
CPS self-diagnostics data;
controlling subject condition status;
inter-relation of controlling subjects on the process level.

In an embodiment, the forecasting model is a neural network. In another embodiment, the forecasting model contains a set of models, such as an ensemble, which makes a decision by averaging the results of the operation of individual models from the set. In yet another embodiment, the neural network is optimized using genetic algorithms. In another embodiment, the neural network is chosen using one of the quality metrics: a NAB metric, an F1 metric.

In yet another embodiment, when calculating the total forecast error, for errors of each CPS feature, weight ratios are used. For example, a low value can be assigned to the weight ratio for an feature if the controlling subject characterized by this feature provides data with noise or invalid data, or is occasionally disabled by the CPS user. In another example, a low value can be assigned to the weight ratio for a feature in which the occurrence of an anomaly does not affect the CPS operation, and a high value can be assigned to the weight ratio for a feature in which the occurrence of an anomaly affects the CPS operation.

In one embodiment, exponential smoothing is applied to the total forecast error to reduce the error.

In one embodiment, when calculating the total forecast error, weight ratios are used for the errors of each CPS feature. For example, the value of the weight ratio of a feature is determined by how accurately the values of this CPS feature can be forecasted. In this case, an error weighted with determined weight ratios can be considered as the forecast error.

In yet another embodiment, the CPS's technical documentation or a user report on the anomalies previously detected by the trained system is obtained. In an embodiment, a feature's weight ratio is chosen using the training tool 211 depending on the significance of the feature and based on the CPS technical documentation or user report.

Discussed below is an example of the operation of the described systems and methods depicted in FIGS. 2-5. After obtaining an initial sample containing CPS feature values for the historical CPS monitoring period—$T_0$, a training sample is built—for the monitoring period $T_1 \subseteq T_0$ (i.e. the monitoring period $T_1$ is a subset $T_0$). The training sample consists of m CPS features at each moment of monitoring time $x_t$ (vector of CPS feature values) of the monitoring period:

$$x_t = x_t^1, \ldots, x_t^m), \text{ where:}$$

$t \geq 0$ is the time, and $m > 0$ is the number of features.

The input time window for the above-mentioned features is L (so that the window length is positive), h is the forecast horizon, $\hat{L}$ is the forecast window (so that the window length is positive), i.e. the time period for which the feature values are forecasted based on the feature values data in the time period L. In this case, L, $\hat{L} \subseteq T_1$.

Figure 6:
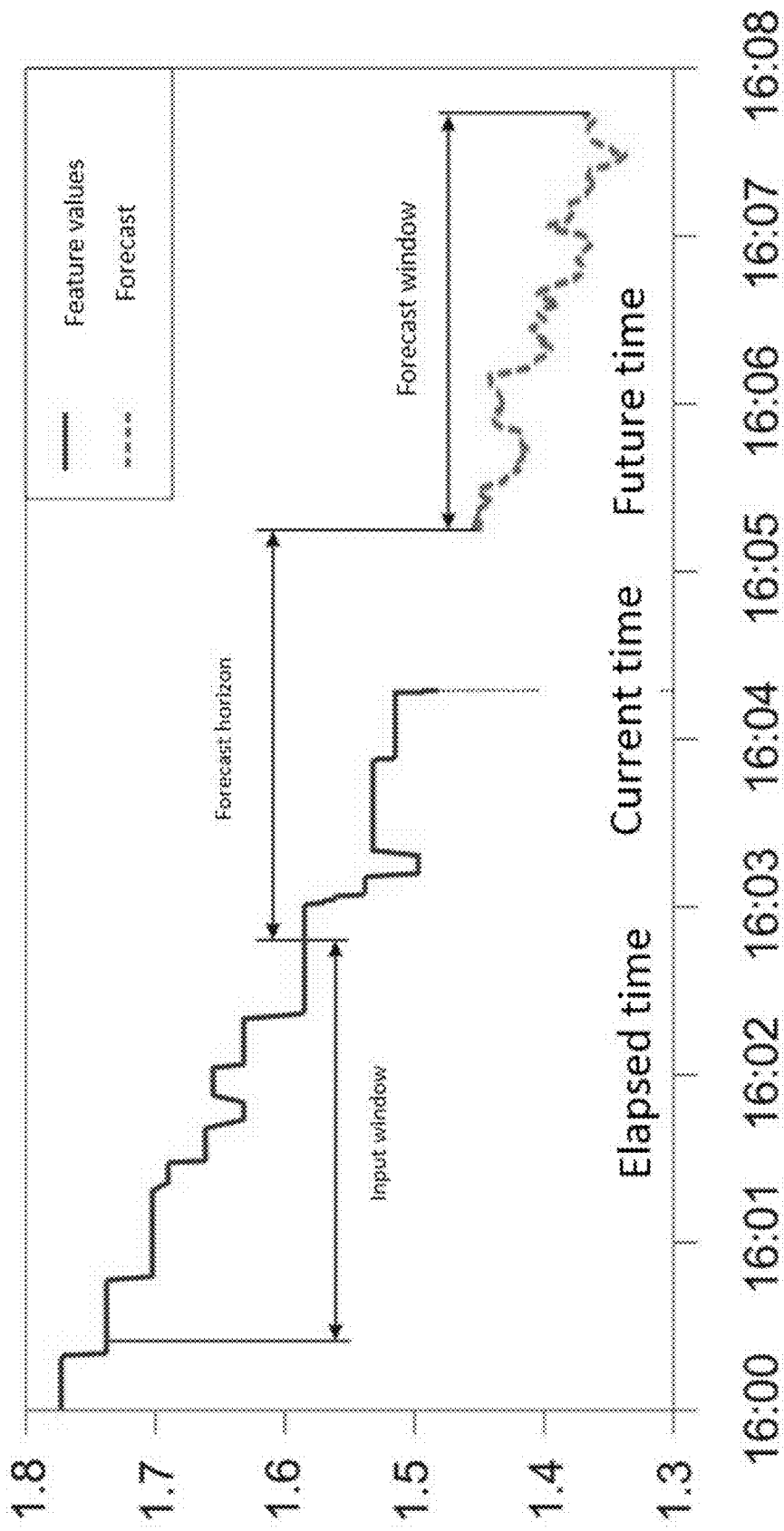
FIG. 6 is an example graph of time dependence of the values of one feature, and which illustrates an input window, a forecast window, and a forecast horizon, according to an embodiment.

Referring to FIG. 6, an example graph of time dependence of the values of one feature, and which illustrates an input window, a forecast window, and a forecast horizon is depicted, according to an embodiment. In particular, FIG. 6 illustrates an example of time dependence of the values of one feature and indicates the input window L, the forecast window $\tilde{L}$ and the forecast horizon h. Generally, the input window L and the forecast window $\tilde{L}$ may or may not overlap. As applied to the example presented, discussed below is the operation of the system and method for training a model for forecasting CPS feature values and calculating an error threshold R to identify an anomaly, and of a CPS having determined characteristics as per FIGS. 2-3. The training sample, built using the initial sample and taking into account the CPS characteristics, includes the CPS feature values for the monitoring period (for example, the entire interval from 16:00 to 16:08). Using the training sample, a CPS feature value forecasting model is built, at each moment of time of the forecast window $\tilde{L}$ using the CPS feature values data at each time moment of the input window L. The input window L and the forecast window $\tilde{L}$ are contained within the monitoring period and are selected in accordance with the CPS characteristics. The forecast horizon h is also selected depending on the CPS characteristics. The forecast feature values are calculated using the following formula:

$$\{\tilde{x}_t\}_{t \in \tilde{L}} = F(\{x_t\}_{t \in L}), \text{ where}$$

F(·) is the forecasting model.

In an embodiment, training of the forecasting model occurs using the data of the entire training sample. Then, the CPS feature values are forecasted at each time moment of the monitoring period. This can occur by moving the input window and the forecast horizon so as to finally obtain forecast values of CPS features at each time moment of the monitoring period. After that, the total forecast error is determined for the CPS variables at each time moment of the forecast window. In an embodiment, the total forecast error at the time moment t is the average error:

$$M_t^p = \frac{1}{m}\sum_{j=1}^{m}|x_t^j - \tilde{x}_t^j|^p, \text{ where } p > 0.$$

The difference $|x_t^j - \tilde{x}_t^j|^p$ can be determined as the feature forecast error with the number $j=\overline{1,m}$ at the time moment t≥0. In yet another embodiment, the total error threshold of the forecast R can be calculated as a set accuracy percentage of the total forecast error $\{M_t^p\}_t$ (for example, a percentage of the order of 0.95). Therefore, an anomaly will occur if $\{M_t^p\}_t > T$. In addition, exponential smoothing can be applied to the total forecast error.

As applied to the example presented above, discussed herein is the operation of the system and method for identifying the source of anomaly in a CPS having determined characteristics as per FIGS. 4-5. Depending on the embodiment, CPS feature values can be obtained either in the real time mode for identification of the source of anomaly in the CPS at the current moment of time, or for the historical monitoring period for retrospective identification of the source of anomaly in the CPS. For illustration purposes, discussed below is an embodiment where CPS feature values are obtained in a real time mode. Thus, the CPS feature values are obtained during the input window L (which is determined by the trained forecasting model, see FIGS. 2-3). Then, using the trained forecasting model and based on the CPS feature values data obtained during the input window L, the CPS feature values for the forecast window $\tilde{L}^L$ are forecasted. For the forecast window, the total forecast error for CPS features for the forecast window is determined, and if the total forecast error exceeds the total error threshold, the anomaly in the CPS is identified. After that, at least one CPS feature which is the source of the anomaly is identified, if the contribution of this CPS feature to the total forecast error is higher than the contribution by other CPS features to the total forecast error.

Figure 7:
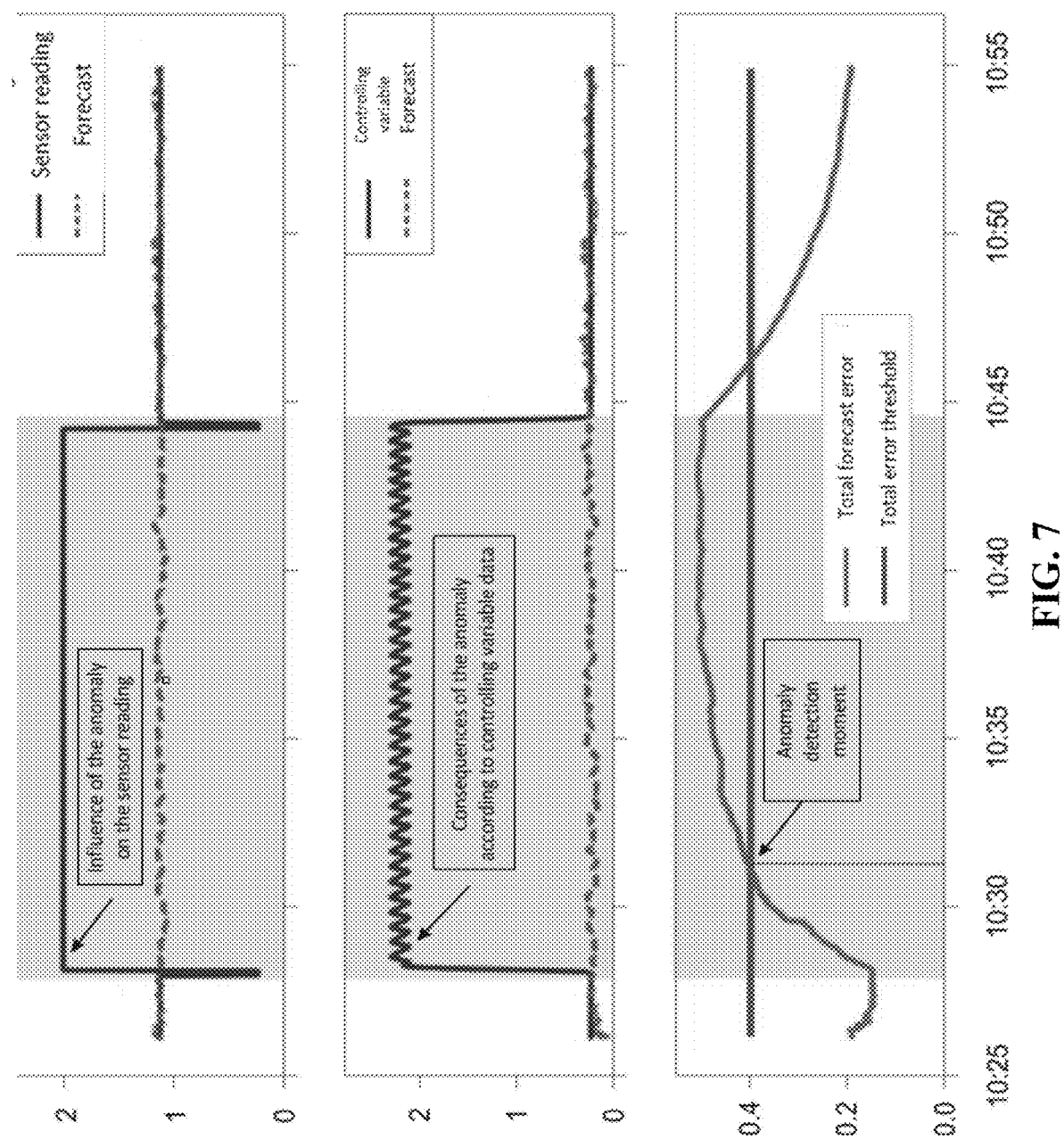
FIG. 7 is example graphs of time dependences of feature values, feature forecast values and total forecast error in the time neighborhood of the anomaly occurrence moment, according to an embodiment.

Referring to FIG. 7, example graphs of time dependences of feature values, feature forecast values and total forecast error in the time neighborhood of the anomaly occurrence moment are depicted, according to an embodiment. In particular, the top two diagrams show the dynamics of changes in feature values, i.e. real values received from the relevant controlling subjects (sensors, actuators and PID controllers), and the dynamics of their forecast values obtained using the systems and methods described in FIGS. 2-5. The lower diagram shows the dynamics of the total forecast error (for both features) and the moment when the error exceeds the total error threshold, which indicates the occurrence of an anomaly.

In one embodiment, exponential smoothing is applied to the total forecast error to reduce the error.

Figure 8:
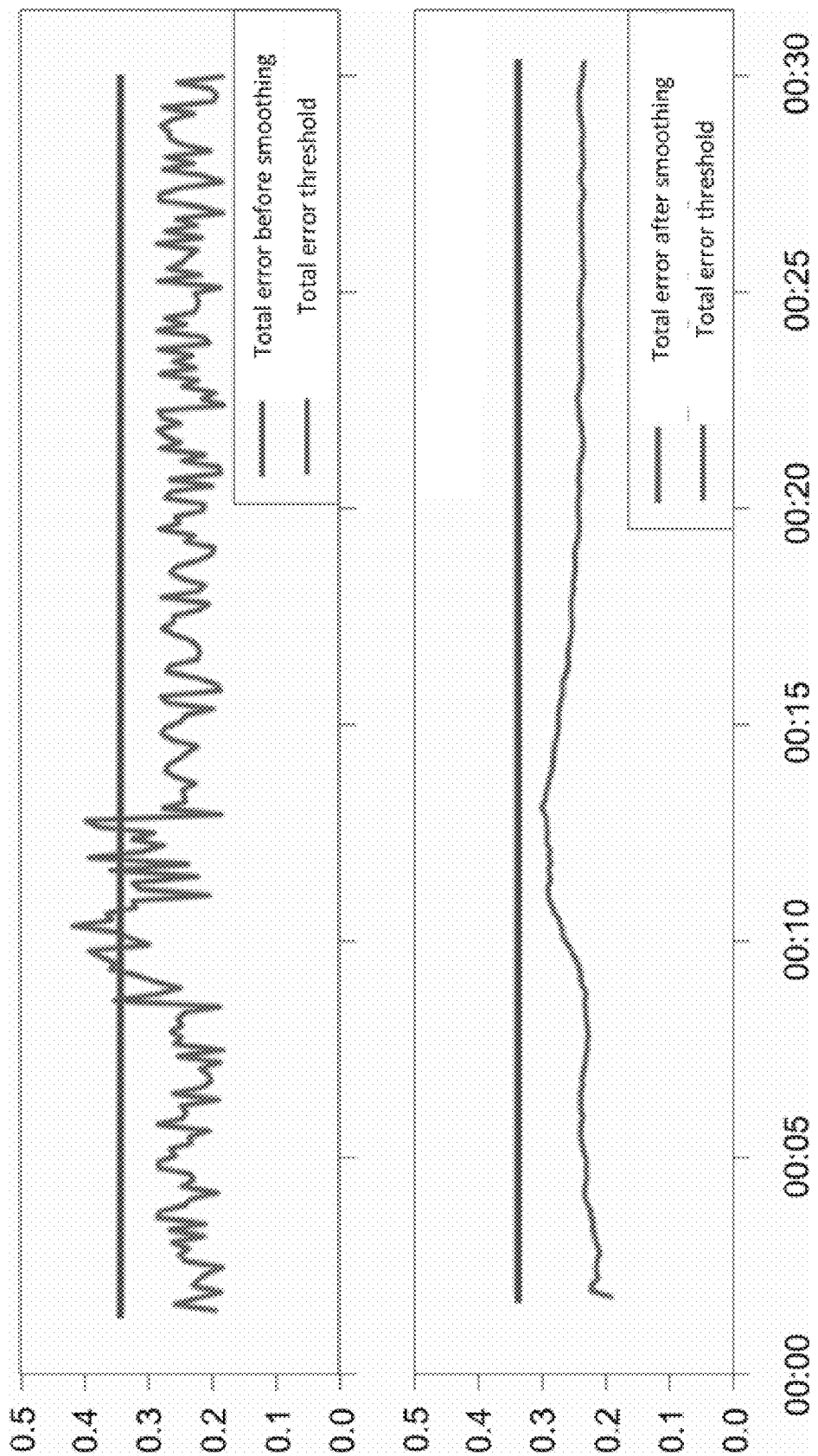
FIG. 8 is example graphs of the dynamics of the total forecast error before smoothing and after smoothing, according to an embodiment.

Referring to FIG. 8, example graphs of the dynamics of the total forecast error before smoothing and after smoothing are depicted, according to an embodiment. In particular, referring to the upper graph, in a first case, using the system and method as per FIGS. 4-5, the anomaly identification tool 222 would identify an anomaly because the total error exceeded the total error threshold. However, referring to the lower graph in a second case, no anomaly is identified, which is a more accurate depiction due to a decrease in the short-term deviations of the error. This means that smoothing of the total forecast error allows for a reduction in multiple identifications of the same anomaly from noise in the error. Once an anomaly is identified, the CPS features which are the source of the anomaly are determined, with the greatest contribution to the total forecast error.

In an embodiment, the mean error of p>0 severity (for example, a mean squared error) can be used as the total forecast error. In another embodiment, the total forecast error can be the weighted average error of p severity.

In an embodiment, in the system and method described in FIGS. 4-5, when identifying the anomaly, the CPS user (operator) can be shown corresponding information about the identified anomaly. For example, graphs of changes in the values of variables in the period that includes the time moment when the anomaly was detected can be displayed. Also, the graph can depict the forecast values of variables, the total error threshold and the error threshold of the relevant variable, and an indication of the time moment when the anomaly was detected and of the variables which are the sources of the anomaly. In an embodiment, after an additional analysis, a CPS user can confirm or negate the detection of the anomaly, and of the variables which are the source of the anomaly. This allows for a reduction in the error and an increase the accuracy of detection of anomalies and identification of variables which are the source of the anomaly. The system for building data for monitoring a cyber-physical system for the purpose of early detection of anomalies in a system including a graphical user interface (GUI) will be shown below, in FIG. 9.

Figure 9:
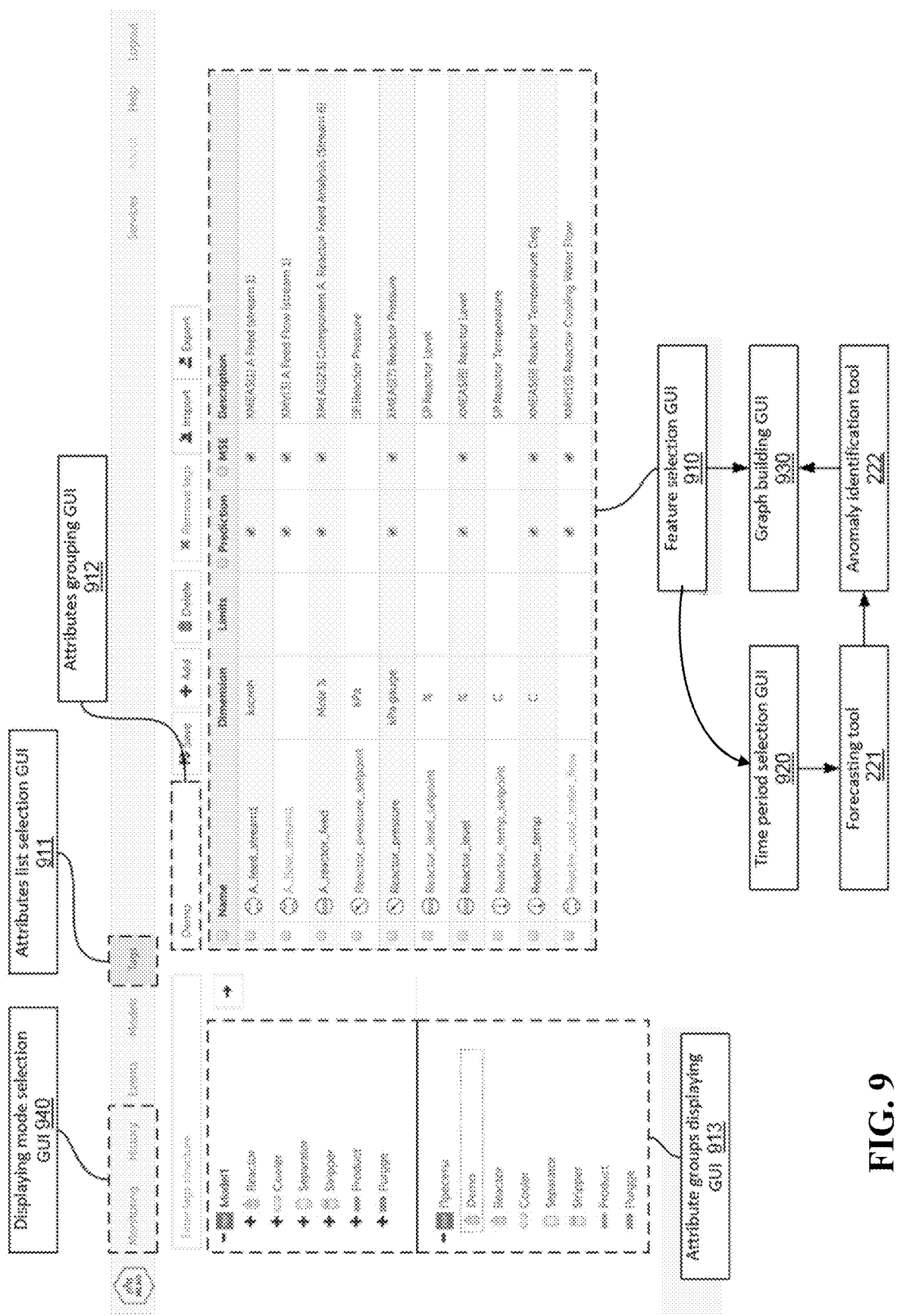
FIG. 9 is a block diagram of a system for building data for monitoring a cyber-physical system for early detection of anomalies with a graphical user interface (GUI) system, according to an embodiment.

Referring to FIG. 9, a block diagram of a system for building data for monitoring a cyber-physical system for early detection of anomalies with a GUI system is depicted, according to an embodiment. A GUI system includes at least one GUI element for the choice of a feature 910, which contains, in particular, a list of features of a cyber-physical system (hereinafter referred to as the "list of features") and is configured for receiving information about the CPS user-selected (or CPS operator-selected) at least one CPS feature from the features list. The features list is chosen using a feature list selection GUI 911. In addition, at least one element of a time period selection GUI 920 is configured for receiving information about the user-selected time period for the monitoring of the selected CPS features. The system also includes a forecasting tool 221, configured for building a forecast for CPS features for the specified monitoring time period, and an anomaly identification tool 222, configured for building a total forecast error for the selected CPS features and a forecast error for each of the selected CPS features for the specified monitoring time period. In this case, the forecasting tool 221 and the anomaly identification tool 222 can operate in accordance with the above-described system and method as per FIGS. 4-5 and in the corresponding embodiments. Further, the embodiments described for FIGS. 2-5 are also applicable to the GUI system.

At least one graph-building GUI element 930 is configured to build, for the specified monitoring time period, graphs for the values of the data built by the forecasting tool 221 and by the anomaly identification tool 222. In an embodiment, the data values can include each selected CPS feature; the forecast for each selected CPS feature; the total forecast error for the CPS values; the forecast error for each selected CPS feature; and/or the total forecast error threshold.

The anomaly identification tool 222 is additionally configured for determining an anomaly in the CPS when the total forecast error exceeds the total error threshold. Further, the graph-building GUI element 930 is additionally configured for building data about the anomaly in the CPS and for building a graph of the values for at least one of all CPS features (i.e. from the above-mentioned features list), if the contribution by the forecast error of the above-mentioned at least one CPS feature to the total forecast error is greater than the contribution by at least one other CPS feature (also from the number of all CPS features from the features list) to the total forecast error.

Figure 10A:
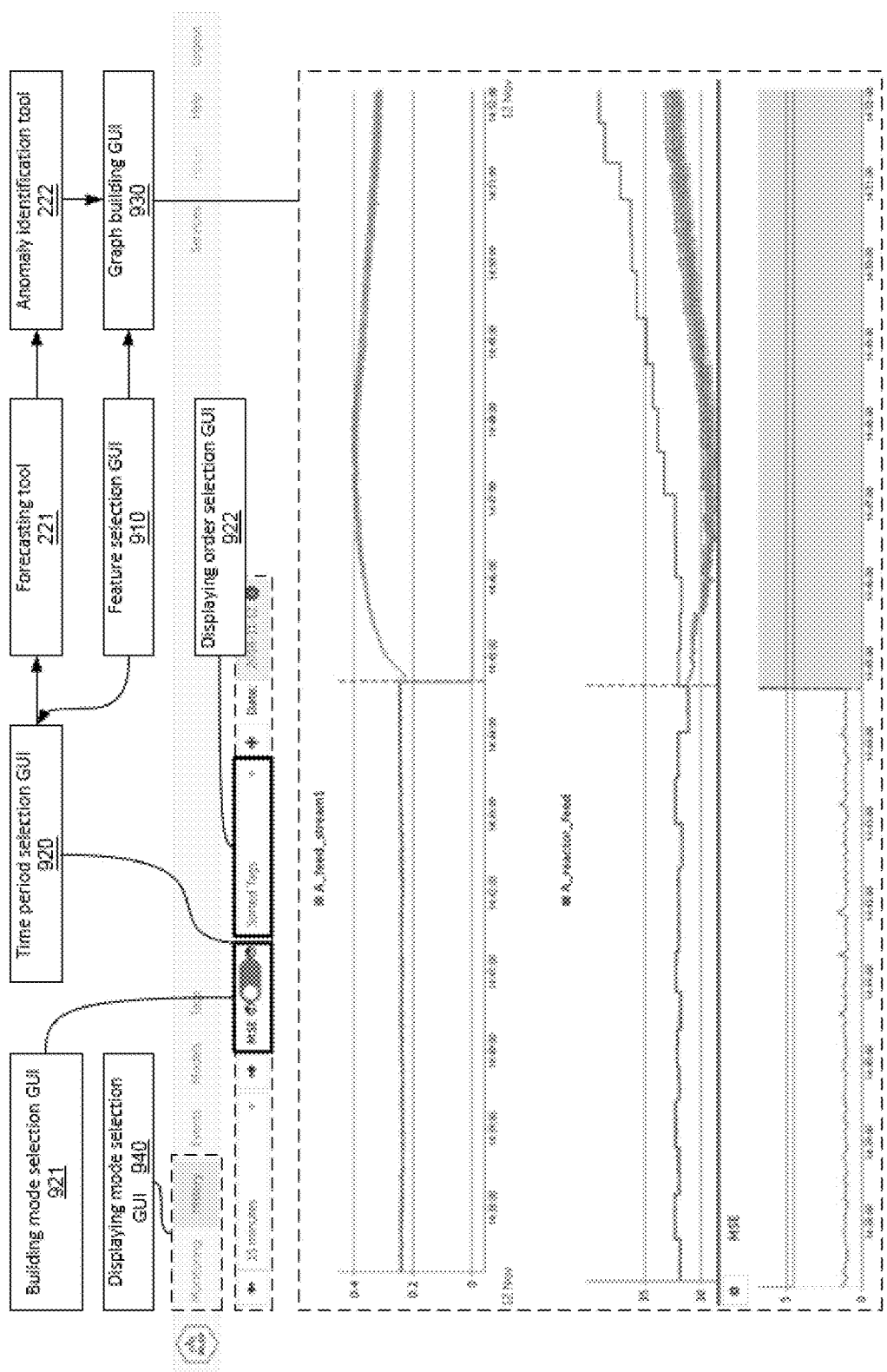
FIGS. 10a-10c are example GUI elements for selecting a displaying mode, for building an feature forecast error, and for selecting a displaying order, according to an embodiment.
Figure 10B:
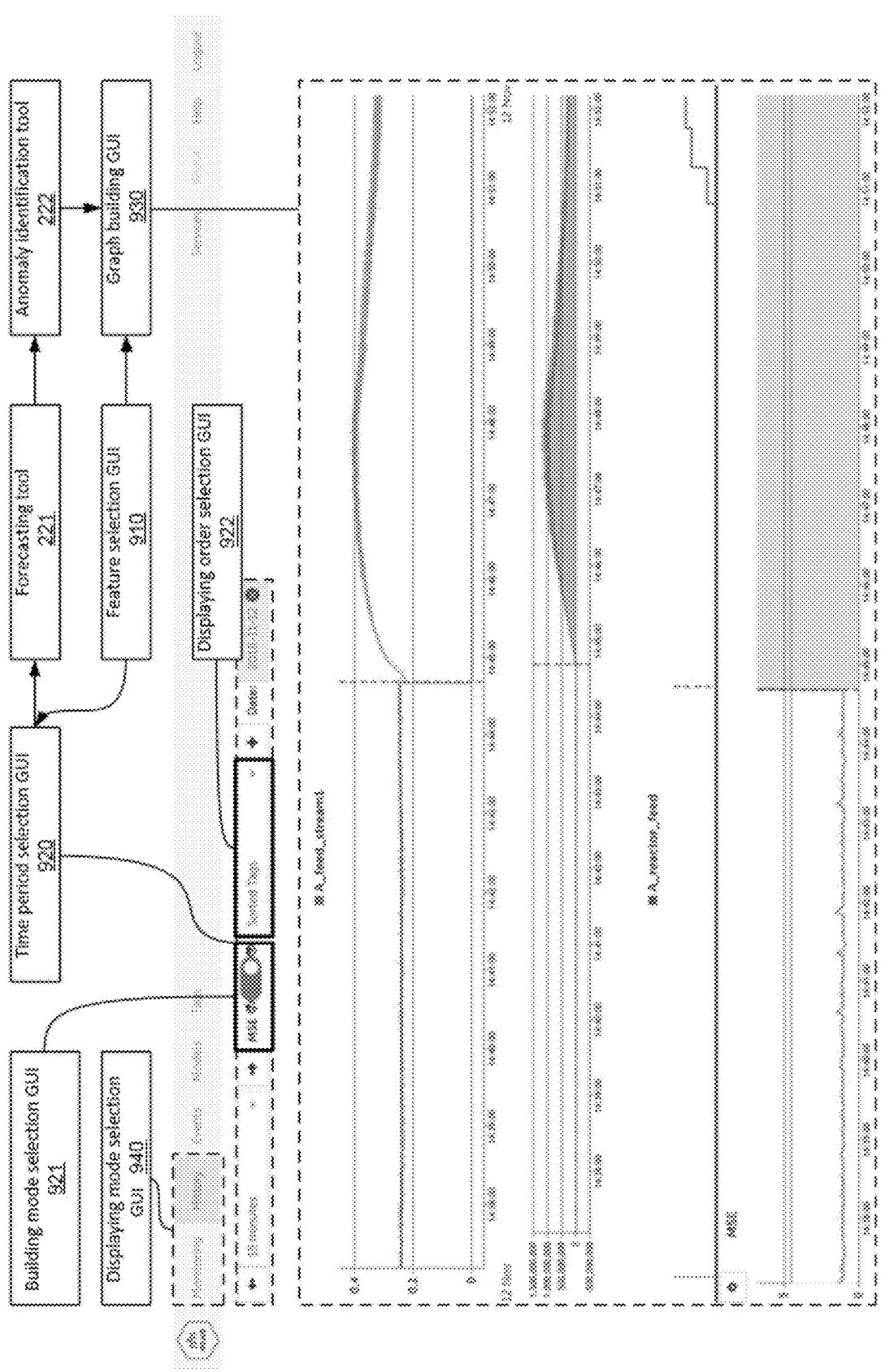
Figure 10C:
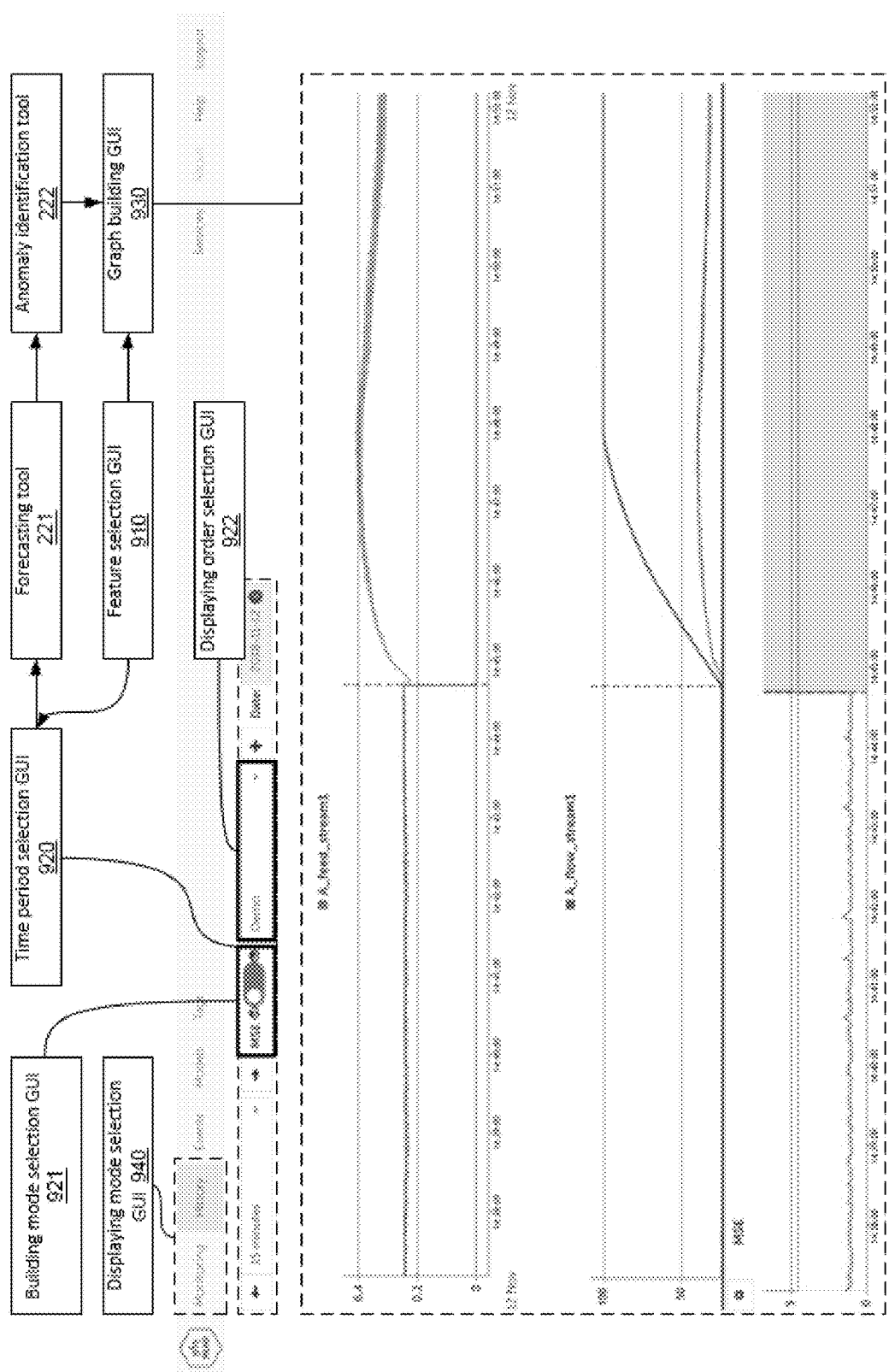

FIG. 9 and FIGS. 10*a*-10*b* also illustrate examples of the system operation and further components. In particular, FIGS. 10*a*-10*c* are example GUI elements for selecting a displaying mode, for building an feature forecast error, and for selecting a displaying order, according to an embodiment.

Namely, using a feature selection GUI element 910, the user is able to select the features for which graphs were created (built) using the graph building GUI 930 for the specified monitoring time period 920. For example, in FIG. 10*a*, the top two graphs are graphs of real values and forecast values for the selected features («A_feed_stream1» and «A_reactor_feed»). The bottom (third) graph depict the total forecast error for all CPS features (i.e. calculated on the basis of the real and the forecast values of all CPS features from the above-mentioned list of features) and the total forecast error threshold (the horizontal line). In this case, the moment of occurrence of an anomaly in the CPS is also shown (the vertical dotted line in the center of each graph). The moment of occurrence of the anomaly is the time at which the total forecast error exceeds the total error threshold. Since the total forecast error is composed of feature forecast errors, the forecast error of each feature can be insignificant, while the total forecast error can exceed the total error threshold, causing an anomaly. Therefore, it is difficult for a CPS user to detect such an anomaly. However, by the system proposed in FIG. 9, a user can simplify this process. Specifically, a user can determine the anomaly occurrence moment and to build graphs of CPS feature values and of the forecast values of these features (and subsequently provide them to the user). The above-mentioned graphs built by the graph-building GUI 930 can be built (and displayed to the user) both for the user-selected features and for the features (from among all the CPS features) from the above-mentioned features list that have the greatest forecast error (i.e. the contribution to the total forecast error by these features is greater than the contribution by other selected features). Such features are the most probable sources of an anomaly.

In an embodiment, the GUI system described in FIG. 9 additionally includes a displaying mode selection GUI element 940, configured for receiving information about the user-selected mode for monitoring the selected CPS features, such as a real time mode or an encoding—decoding mode If the real time mode is selected, the graph-building GUI element 930 builds graphs of the above-mentioned values at the current moment of time. (see FIGS. 10*a*-10*c*).

The above-described system also contains a feature forecast error building GUI element 921, configured for receiving information about the user-selected mode of building or non-building of forecast error for selected features into the graph-building GUI element 930, such as a mean squared error (MSE). For example, in FIG. 10*a* and FIG. 10*c*, display of the feature forecast error is not selected. However, FIG. 10*b* has display of the feature forecast error selected. As a result of this selection, after the graph for each feature, a graph for the forecast error of that feature is displayed into the graph-building GUI element 930. For example, the upper graph is for the «A_feed_stream1» feature and the middle graph contains the forecast error of this feature. The bottom graph shows the total forecast error for the features.

The displaying order selection GUI element 922 is configured for receiving information about the user-selected method for sorting the selected features and for displaying them to the graph building GUI element 930. For example, the "sorted tags" mode can be selected, as selected in FIGS. 10*a*-10*b*), when the feature values graphs will be sorted by the greatest forecast error. In an embodiment, the graphs can be sorted from the greatest forecast error for the feature in the first graph to the smallest forecast error for the feature in the last graph. This displaying mode can be the displaying mode selected as the default one. The displaying mode also allows the system to automatically build and provide the CPS user with information on the most likely anomaly occurrence and TP breach location. A displaying mode can also be chosen in the order in which the selected features are contained in the above-mentioned CPS features list (selected in FIG. 10*c*).

Figure 12:
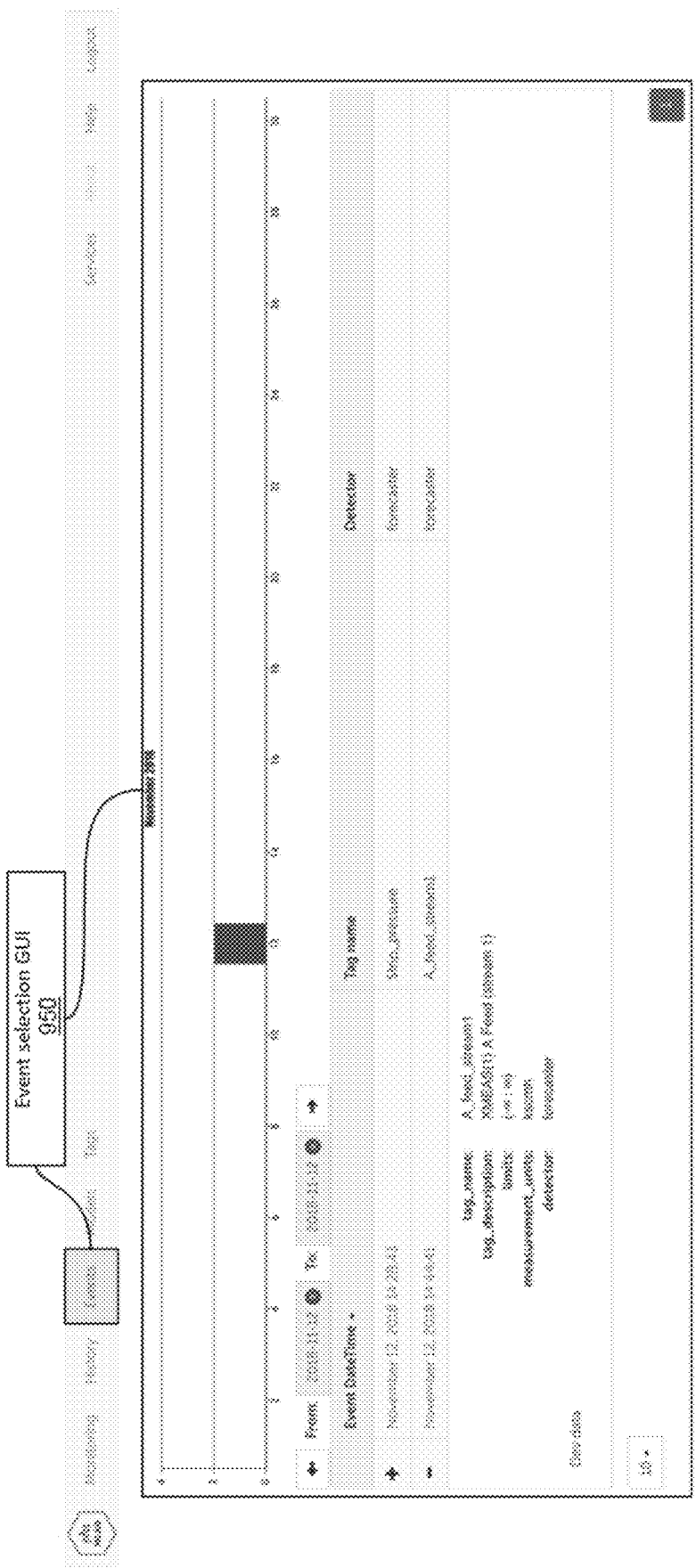
FIG. 12 depicts example GUI elements for selecting events, according to an embodiment.

In another embodiment, the GUI system additionally contains at least one event selection GUI element 950 (see FIG. 12, which depicts example GUI elements for selecting events, according to an embodiment), configured for building a list of CPS events where an anomaly occurred, and, if the user selects one of the above-mentioned events, the above-mentioned at least one event selection GUI element 950 is configured for building, for the selected event, a graph of the values of the above-mentioned data at the moment when the anomaly occurred and for the specified monitoring time period.

In one embodiment, the above-mentioned list 910 for each CPS feature additionally contains at least one of the feature's identifier; the feature's description; forecast errors for the feature; the feature's monitored value; the feature's forecasted value; the feature's measuring units; the feature's allowable change limits; and the feature's reference to equipment (PLC, etc.).

Figure 11A:
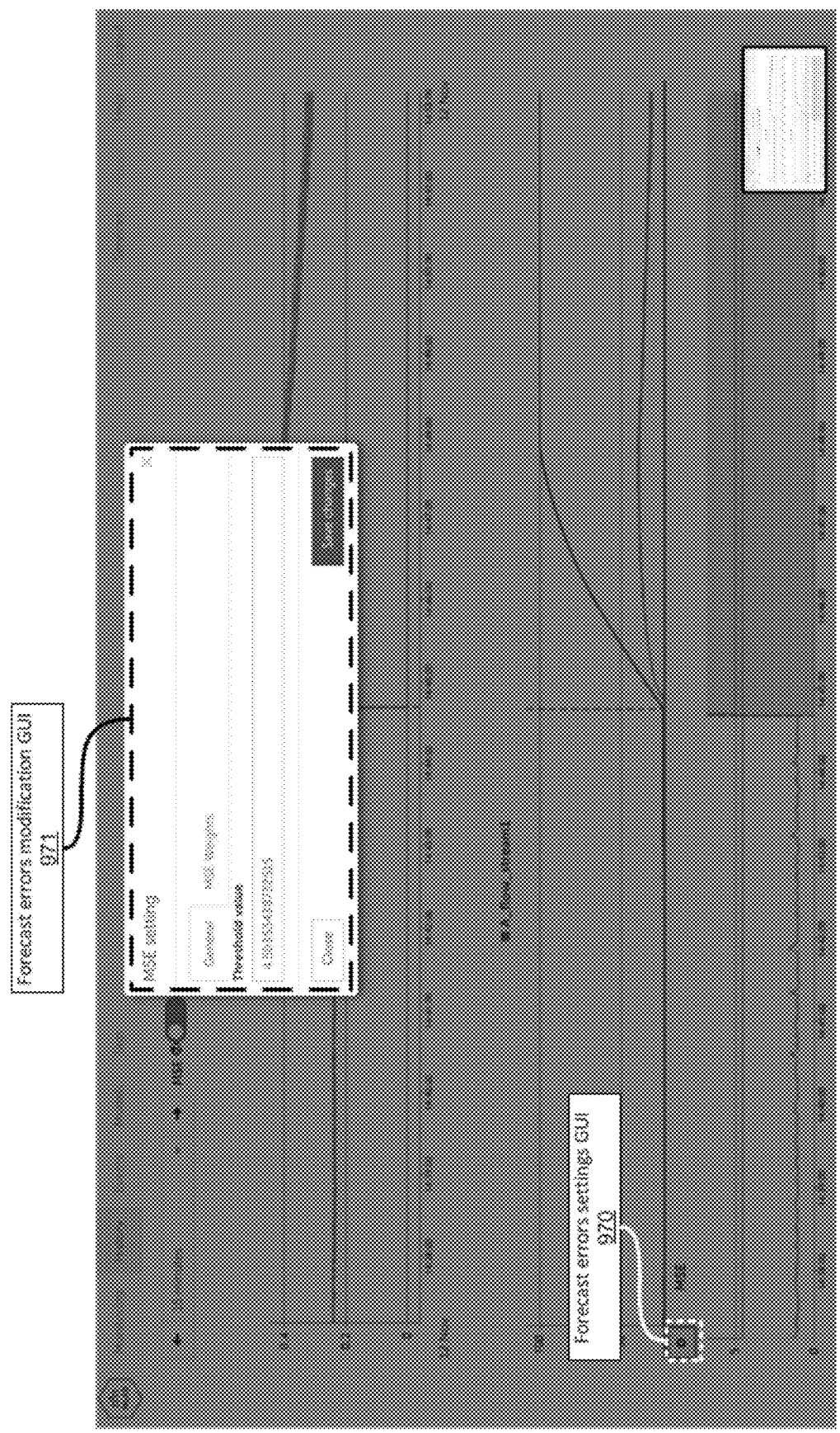
FIG. 11a depicts example GUI elements for forecast error settings, according to an embodiment.

Referring to FIG. 11a, example GUI elements for forecast error settings are depicted, according to an embodiment. In particular, FIG. 11a illustrates a forecast error settings GUI element 970, configured for receiving information about the user's selection for displaying the forecast error change GUI 971, which, in turn, is used to display the current value of the total forecast error threshold and is configured for receiving information about the changes made by the user to the values of the above-mentioned total forecast error threshold. As a result, the forecast error change GUI 971 can change the value of the above-mentioned total forecast error threshold. For example, the user can increase the total forecast error threshold if there are a large number of false triggering occurrences. Thus, a changed value of the total forecast error threshold will also cause corresponding changes when an anomaly is identified in the CPS (in FIGS. 4-5).

Figure 11B:
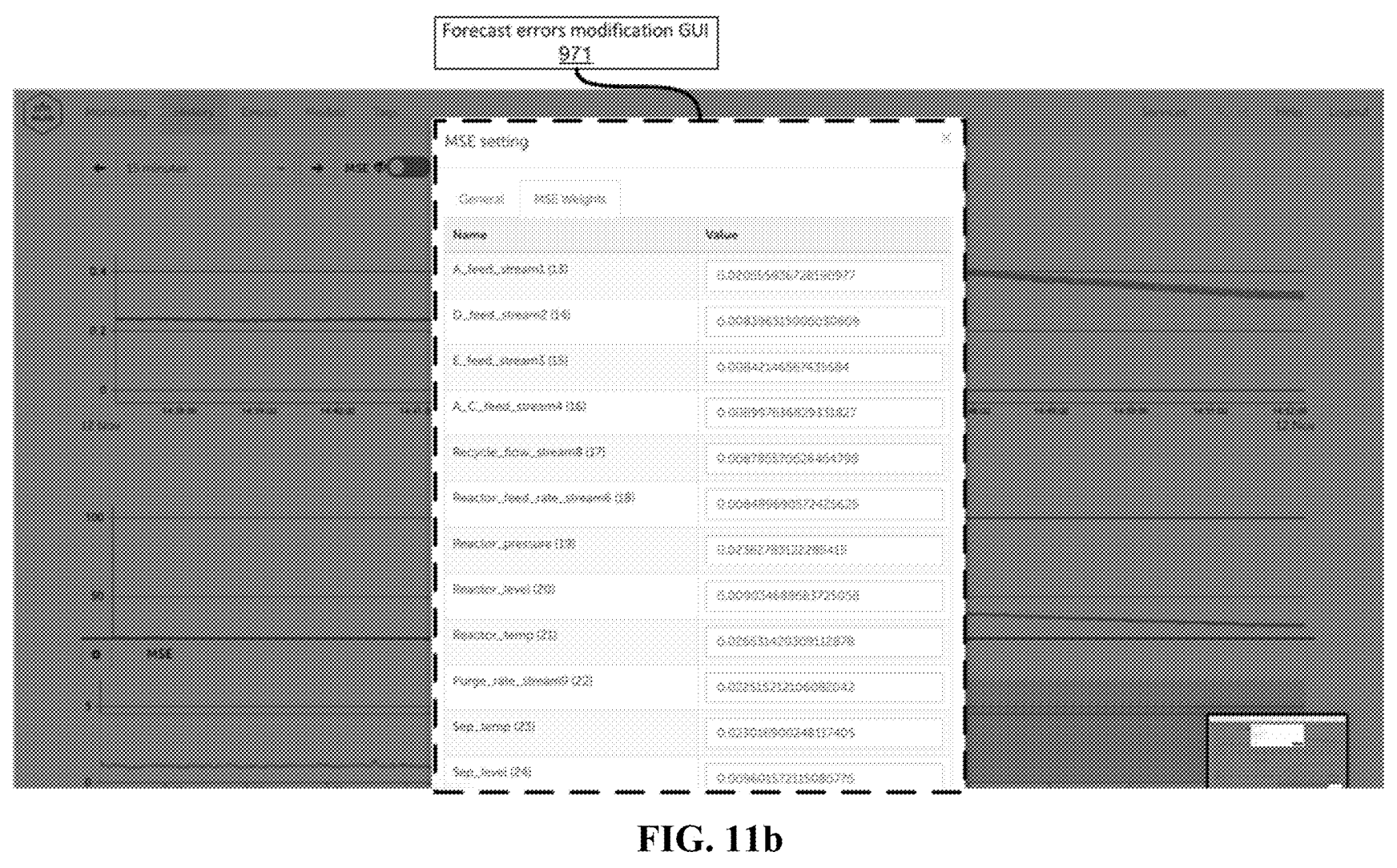

Referring to FIG. 11b, example GUI elements for modifying forecast errors are depicted, according to an embodiment. In particular, FIG. 11b illustrates forecast error change GUI 971, which can additionally be configured for displaying the values of weight ratios for the forecast errors of each selected CPS feature and for receiving the user-made changes of the values of the described weight ratios. In an embodiment, the total forecast error can be be recalculated, for example, by the forecasting tool 221, using the changed values of the above-mentioned weight ratios.

In another embodiment, at least one of the feature grouping GUI elements 912 is configured to receive information about the user-selected group of features, such as features relating to one PID controller. For example, the graph-building GUI element 930 builds graphs of the above-mentioned values for the specified monitoring time period for the CPS features from the selected group of features, allowing the user to quickly switch between different created groups that can be referenced to TP areas important for the user.

In one embodiment, at least one feature group displaying GUI element 913 is configured for displaying CPS features from the built groups of features. For example, as a result of the grouping of features by the GUI 912, feature groups can be built and displayed in the GUI 913. In an embodiment, the user is able to select and edit the groups, and to display graphs of values for the CPS features from the specified groups using the GUI 930.

In another embodiment, at least one GUI element is functionally able to build sublists from the user-selected CPS features, and, if the user selects the sublist, to build graphs of values for the features from the sublist (not shown in the figures).

Figure 13:
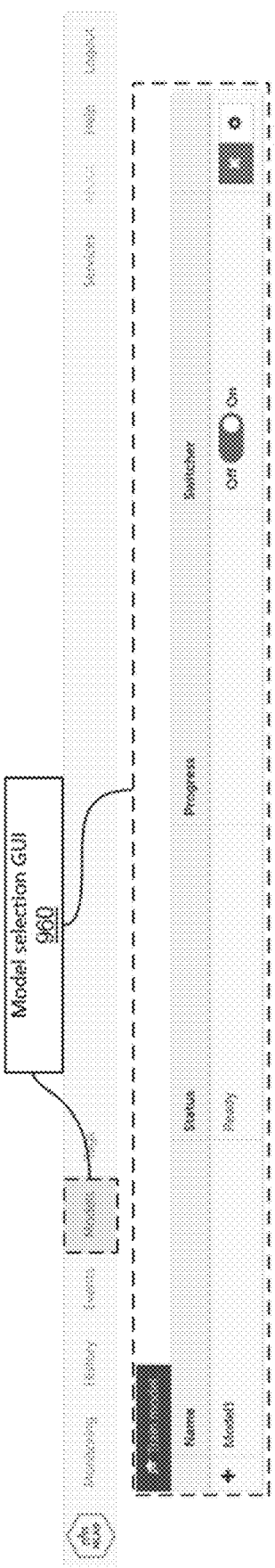
FIG. 13 depicts example GUI elements for selecting models, according to an embodiment.

Referring to FIG. 13, example GUI elements for selecting models are depicted, according to an embodiment. In particular, FIG. 13 depicts a model selection GUI element 960, configured for selecting a model for forecasting values of CPS features.

Figure 14:
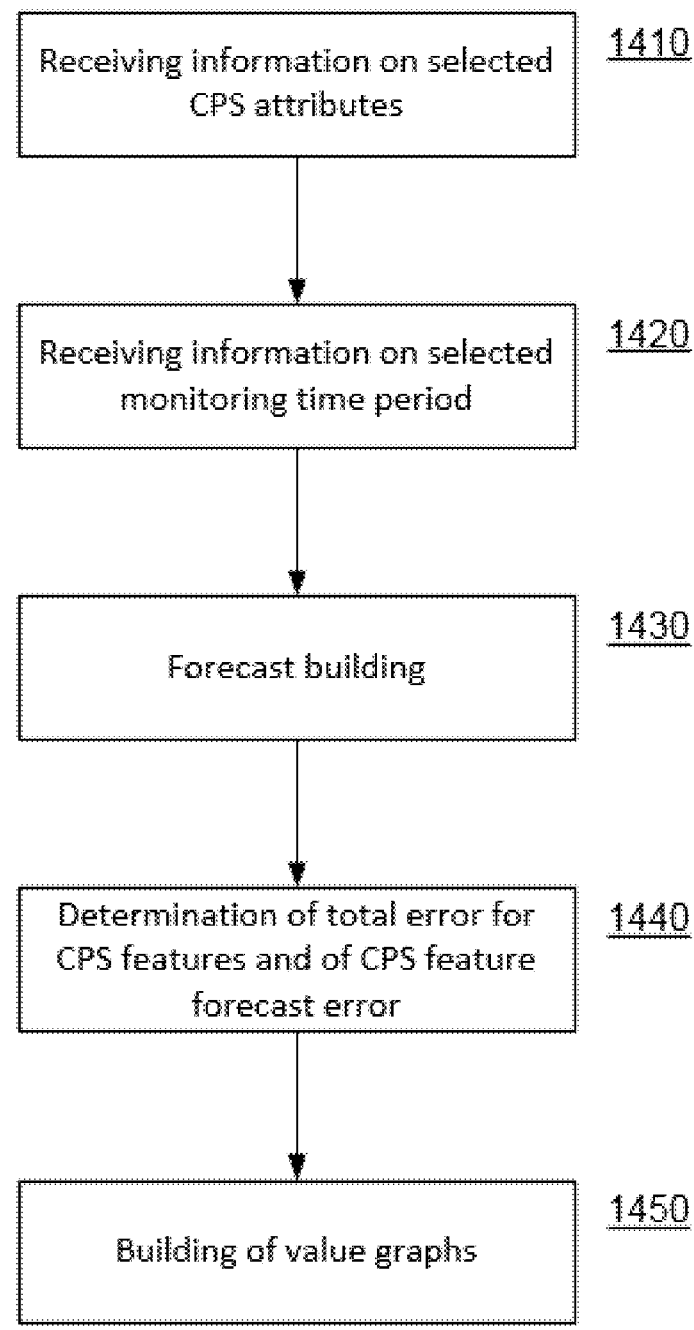
FIG. 14 is a flowchart of a method for building data for monitoring a cyber-physical system for the purpose of early detection of anomalies in a system having a GUI, according to an embodiment.

Referring to FIG. 14, a flowchart of a method for building data for monitoring a cyber-physical system for the purpose of early detection of anomalies in a system having a GUI is depicted, according to an embodiment. In particular, FIG. 14 illustrates a method for building data for monitoring a cyber-physical system for the purpose of early detection of anomalies in a graphical user interface (GUI) system.

At 1410, using at least one feature selection GUI element 910, which includes a list of features of a cyber-physical system, the method receives information about the user-selected at least one CPS feature from the above-mentioned list of features. At 1420, using at least one element of the time period selection GUI 920, the method receives information about the user—selected time period for the monitoring of the selected CPS features. At 1430, using the forecasting tool 221, the method builds, in a specified monitoring time period, a forecast of values of CPS features, using the model for forecasting values of selected CPS features. At 1440, using the anomaly identification tool 222, the method determines, in the specified monitoring time period, the total forecast error for the selected CPS features and the forecast errors for each selected CPS feature. At 1450, using at least one graph-building GUI element 930, the method builds, in the specified monitoring time period, graphs for monitoring the CPS. In an embodiment, such graphs include each selected CPS feature; the forecast for each selected CPS feature; the total forecast error for the CPS values; the forecast error for each selected CPS feature; and the total forecast error threshold.

The embodiments described above in FIGS. 9-13 for a GUI system are also applicable to the method as per FIG. 14.

The system and method as per FIGS. 9-14 provide a graphical user interface enabling the user to monitor a cyber-physical system for the purpose of early detection of anomalies and implement automated user monitoring of a cyber-physical system for early detection of anomalies. In addition, such systems and methods solve the technical problem consisting in the absence of a system for building data for monitoring a cyber-physical system, for detecting anomalies in a graphical user interface, in which the time elapsed from the moment of occurrence of the anomaly in the CPS to the moment of its detection is shorter than in the existing systems.

Figure 15:
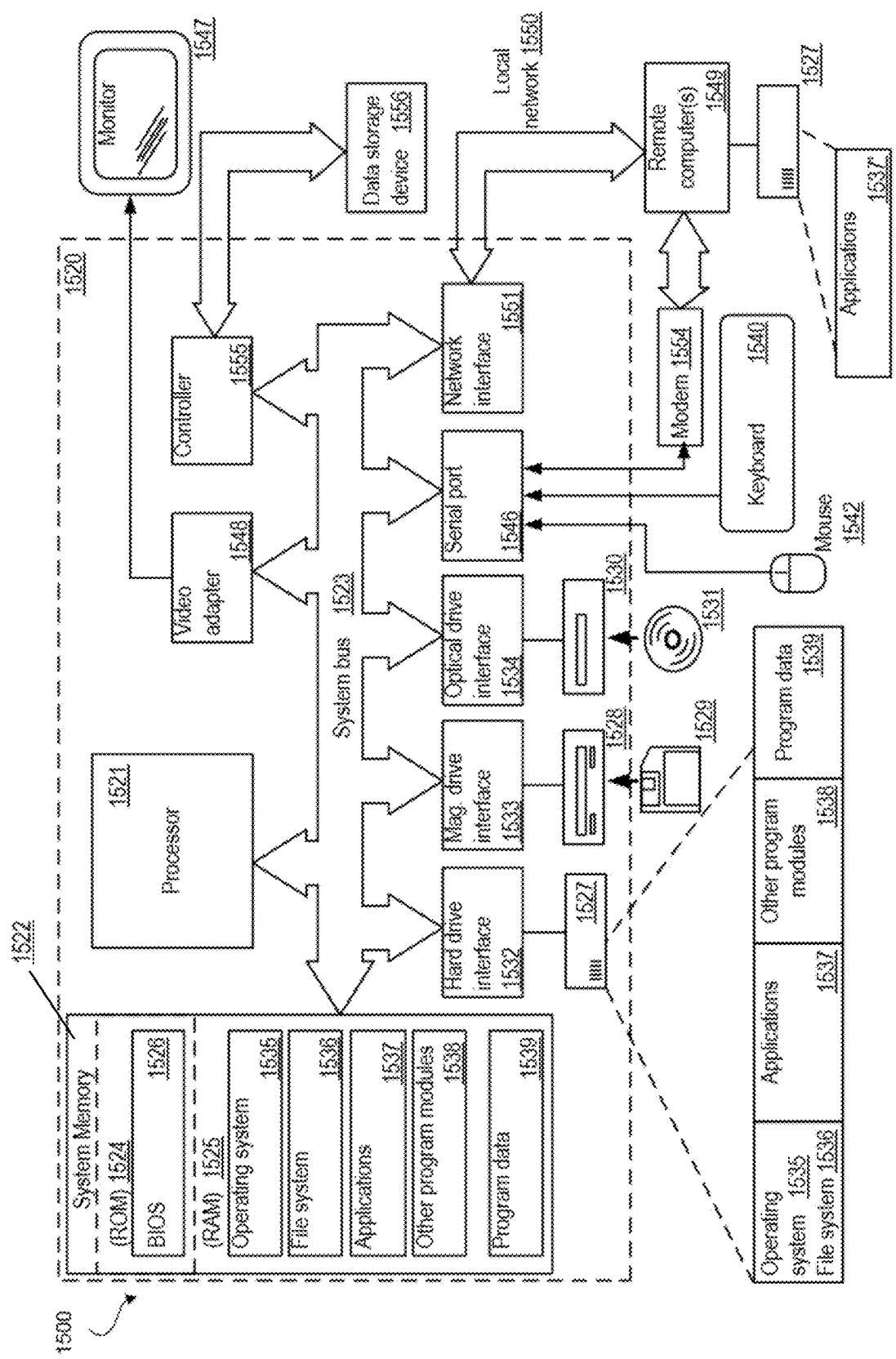
FIG. 15 is a block diagram of a computer system configured to implement embodiments described herein.

Referring to FIG. 15, a diagram illustrating in greater detail a computer system 1500 on which aspects of the invention as described herein may be implemented according to various embodiments is depicted.

The computer system 1500 can comprise a computing device such as a personal computer 1520 includes one or more processing units 1521, a system memory 1522 and a system bus 1523, which contains various system components, including a memory connected with the one or more processing units 1521. In various embodiments, the processing units 1521 can include multiple logical cores that are able to process information stored on computer readable media. The system bus 1523 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 1524 or volatile memory such as Random Access Memory (RAM) 1525. The Basic Input/Output System (BIOS) 1526 contains basic procedures ensuring transfer of information between the elements of personal computer 1520, for example, during the operating system boot using ROM 1524.

Personal computer 1520, in turn, has a hard drive 1527 for data reading and writing, a magnetic disk drive 1528 for reading and writing on removable magnetic disks 1529, and an optical drive 1530 for reading and writing on removable optical disks 1531, such as CD-ROM, DVD-ROM and other optical media. The hard drive 1527, the magnetic drive 1528, and the optical drive 1530 are connected with system bus 1523 through a hard drive interface 1532, a magnetic drive interface 1533 and an optical drive interface 1534, respectively. The drives and the corresponding computer information media represent energy-independent means for storage of computer instructions, data structures, program modules and other data on personal computer 1520.

The system depicted includes hard drive 1527, a removable magnetic drive 1529 and a removable optical drive 1530, but it should be understood that it is possible to use other types of computer media, capable of storing data in a computer-readable form (solid state drives, flash memory cards, digital disks, random-access memory (RAM), etc.), connected to system bus 1523 through a controller 1555.

The computer 1520 comprises a file system 1536, where the recorded operating system 1535 is stored, as well as additional program applications 1537, other program engines 1538 and program data 1539. The user can input commands and information into the personal computer 1520 using input devices (keyboard 1540, mouse 1542). Other input devices (not shown) can also be used, such as: a microphone, a joystick, a game console, a scanner, etc. Such input devices are usually connected to the computer system 1520 through a serial port 1546, which, in turn, is connected to a system bus, but they can also be connected in a different way—for example, using a parallel port, a game port or a Universal Serial Bus (USB). The monitor 1547 or another type of display device is also connected to system bus 1523 through an interface, such as a video adapter 1548. In addition to monitor 1547, personal computer 1520 can be equipped with other peripheral output devices (not shown), such as speakers, a printer, etc.

Personal computer 1520 is able to work in a network environment; in this case, it uses a network connection with one or several other remote computers 1549. Remote computer(s) 1549 is (are) similar personal computers or servers, which have most or all of the above elements, noted earlier when describing the substance of personal computer 1520 shown in FIG. 15. The computing network can also have other devices, such as routers, network stations, peering devices or other network nodes.

Network connections can constitute a Local Area Network (LAN) 1550 and a World Area Network (WAN). Such networks are used in corporate computer networks or in corporate intranets, and usually have access to the Internet. In LAN or WAN networks, personal computer 1520 is connected to the Local Area Network 1550 through a network adapter or a network interface 1551. When using networks, personal computer 1520 can use a modem 1554 or other means for connection to a world area network, such as the Internet. Modem 1554, which is an internal or an external device, is connected to system bus 1523 through serial port 1546. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for determining a source of anomaly in a cyber-physical system (CPS), the system comprising:
a computing platform including computing hardware of at least one processor and memory operably coupled to the at least one processor;
instructions that, when executed on the computing platform, cause the computing platform to implement:
a training tool configured to—
obtain an initial sample, the initial sample including a plurality of historical CPS feature values,
generate a trained forecasting model based on a training sample built based on the plurality of historical CPS feature values and at least one characteristic of a plurality of historical CPS features, and
train the trained forecasting model based on the training sample;
a forecasting tool configured to—
obtain a plurality of CPS feature values during an input window, the input window determined by the trained forecasting model, and
forecast the plurality of CPS feature values for a forecast window using the trained forecasting model and the CPS feature values obtained during the input window; and
an anomaly identification tool configured to—
determine a total forecast error for the plurality of CPS features in the forecast window,
identify an anomaly in the cyber-physical system when the total forecast error exceeds a total error threshold, and
identify at least one CPS feature as the source of the anomaly when the contribution of forecast error by the at least one CPS feature from among the plurality of CPS features to the total forecast error is higher than the contribution by other CPS features from among the plurality of CPS features to the total forecast error.

2. The system of claim 1, wherein the plurality of CPS feature values are obtained by the forecasting tool in real time, and the total forecast error is determined after a time equal to the sum of a forecast horizon window and the input window, the forecast horizon window comprising the time between the input window and the forecast window.

3. The system of claim 1, wherein the plurality of CPS features are obtained for a historical monitoring period including initial sample data, and the total forecast error is determined by the initial sample data for a historical monitoring period.

4. The system of claim 1, wherein the plurality of CPS features include at least one of a sensor measurement, a controlled variable of an actuator, a setpoint of an actuator, an input signal of a proportional integral derivative (PID) controller, or an output signal of a PID controller.

5. The system of claim 1, wherein the anomaly identification tool is configured to determine the total forecast error by assigning weight ratios to each feature error of the plurality of CPS features, the sum of each feature error comprising the total forecast error.

6. The system of claim 5, wherein the weight ratio for an feature error is assigned a low value for an feature having noisy or invalid data, or if the feature has been previously disabled by a user.

7. The system of claim 5, wherein the weight ratio for an feature error is assigned a low value for an feature when an anomaly for the feature does not affect CPS operation and a high value for the feature when an anomaly for the feature affects CPS operation.

8. The system of claim 1, wherein the training tool is configured to generate the trained forecasting model by:
building the trained forecasting model for forecasting the plurality of CPS feature values at each moment of the forecast window and based on the plurality of CPS feature values at each moment of the input window, the input window and the forecast window located within a monitoring period and selected depending on the at least one characteristic of the historical CPS features.

9. The system of claim 1, wherein the historical CPS feature values include an anomaly occurrence.

10. The system of claim 8, wherein the training tool is further configured for:
forecasting the plurality of CPS feature values at each moment of the monitoring period;
determining a total error of the forecast using the forecasting; and
calculating the total error threshold based on the at least one characteristic of the historical CPS features.

11. The system of claim 1, wherein building the training sample includes:
denoising the initial sample data;
removing any gaps in the initial sample data;
removing any surges in the historical CPS feature values;
removing any invalid data sets in the initial sample data;
converting the initial sample data an equispaced time grid; and
excluding features causing false triggering from the initial sample.

12. The system of claim 1, wherein the training tool is further configured for:
obtaining CPS technical documentation; and
building an features registry using the CPS technical documentation, the features registry including:
a description of an feature,
a physical dimension of the feature,
whether the feature describes a physical quantity of a CPS object,
a design measuring accuracy of the feature,
a weight ratio of the feature, and
a name of the object described by the feature,
and wherein the trained forecasting model is further built based on the features registry.

13. The system of claim 1, wherein at least one of the plurality of CPS feature values includes at least one of:
an industry in which the CPS operates;
a process including continuous, conveyor, or cyclical;
a seasonality or trend signature;
an inertness of a CPS process;
a reaction time of the CPS to changes occurring in the CPS or external environment;
a hazard level of production for personnel or ecology;
a cost of idle technological processes due to abnormal situations;
a type of control using a proportional integral derivative (PID) controller or a state machine,
a control subject signature including at least one of a sensor, an actuator, or a PID controller;
self-diagnostic CPS data;
a state of a control subject including working or non-working; or
a management relationship between processes.

14. The system of claim 1, wherein the instructions that, when executed on the computing platform, cause the computing platform to further implement a graphical user interface configured to:
build a graph for viewing output of the forecasting tool and the anomaly detection tool, the graph including the at least one CPS feature, the forecasted plurality of CPS feature values for the forecast window, the total forecast error, the contribution of forecast error by the at least one CPS feature, and the total error threshold.

15. A method for determining a source of anomaly in a cyber-physical system (CPS), the method comprising:
obtaining an initial sample, the initial sample including a plurality of historical CPS feature values;
generating a trained forecasting model based on a training sample built based on the plurality of historical CPS feature values and at least one characteristic of a plurality of historical CPS features;
training the trained forecasting model based on the training sample;
obtaining a plurality of CPS feature values during an input window, the input window determined by the trained forecasting model;
forecasting the plurality of CPS feature values for a forecast window using the trained forecasting model and the CPS feature values obtained during the input window;
determining a total forecast error for the plurality of CPS features in the forecast window;
identifying an anomaly in the cyber-physical system when the total forecast error exceeds a total error threshold; and
identifying at least one CPS feature as the source of the anomaly when the contribution of forecast error by the at least one CPS feature from among the plurality of CPS features to the total forecast error is higher than the contribution by other CPS features from among the plurality of CPS features to the total forecast error.

16. The method of claim 15, wherein the plurality of CPS feature values are obtained in real time, and the total forecast error is determined after a time equal to the sum of a forecast horizon window and the input window, the forecast horizon window comprising the time between the input window and the forecast window.

17. The method of claim 15, wherein the plurality of CPS features are obtained for a historical monitoring period including initial sample data, and the total forecast error is determined by the initial sample data for a historical monitoring period.

18. The method of claim 15, wherein determining the total forecast error includes assigning weight ratios to each feature error of the plurality of CPS features, the sum of each feature error comprising the total forecast error.

19. A method for training a cyber-physical system (CPS) forecasting model, the method comprising:

obtaining an initial sample, the initial sample including a plurality of historical CPS feature values;

building a training sample based on the plurality of historical CPS feature values and at least one characteristic of the plurality of historical CPS features;

building a trained forecasting model for forecasting the plurality of CPS feature values at each moment of a forecast window and based on a plurality of CPS feature values at each moment of an input window, the input window and the forecast window located within a monitoring period and selected depending on the at least one characteristic of the historical CPS, wherein a forecast horizon between the input window and the forecast window is selected based on the at least one characteristic of the historical CPS; and training the forecasting model based on the training sample.

20. The method of claim 19, further comprising:

forecasting the plurality of CPS feature values at each moment of the monitoring period;

determining a total error of the forecast using the forecasting; and calculating the total error threshold based on the at least one characteristic of the historical CPS features.

\* \* \* \* \*